United States Patent
Sugishita et al.

(10) Patent No.: US 6,430,916 B2
(45) Date of Patent: Aug. 13, 2002

(54) COMBINED CYCLE POWER PLANT

(75) Inventors: Hideaki Sugishita; Hidetaka Mori; Ichiro Fukue; Kazuo Uematsu, all of Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/866,710

(22) Filed: May 30, 2001

Related U.S. Application Data

(62) Division of application No. 09/285,066, filed on Apr. 2, 1999, now Pat. No. 6,260,348.

(30) Foreign Application Priority Data

Apr. 7, 1998 (JP) ............................................. 10-094662
Apr. 7, 1998 (JP) ............................................. 10-094663

(51) Int. Cl.[7] ................................................. F02C 6/18
(52) U.S. Cl. ................................................... 60/39.12
(58) Field of Search ........................... 60/39.12, 39.181, 60/39.182, 39.52, 806

(56) References Cited

U.S. PATENT DOCUMENTS

| | | |
|---|---|---|
| 5,175,995 A | 1/1993 | Pak et al. |
| 5,595,059 A | 1/1997 | Huber et al. ................. 60/29.12 |
| 5,669,216 A | 9/1997 | Ankersmit et al. ......... 60/39.12 |
| 5,704,206 A | 1/1998 | Kaneko et al. ............. 60/39.12 |
| 5,809,768 A | 9/1998 | Uematsu et al. ........... 60/39.52 |

FOREIGN PATENT DOCUMENTS

| | | |
|---|---|---|
| EP | 0 831 205 | 3/1998 |
| JP | 4-191418 | 7/1992 |
| JP | 7-217447 | 8/1995 |
| JP | 8-189380 | 7/1996 |
| JP | 9-144561 | 6/1997 |
| WO | 97/44574 | 11/1997 |

*Primary Examiner*—Louis J. Casaregola
(74) *Attorney, Agent, or Firm*—Wenderoth, Lind & Ponack, L.L.P.

(57) ABSTRACT

Provided is turbine plant using methanol as fuel in which working fluid is compressed by compressor 1 and led into combustor 2. A mixture of $H_2$ and $CO_2$ as fuel added with $O_2$ is burned to generate high temperature gas, which works in high temperature turbine 3, flows through heat exchangers 4, 5 and returns partly to the compressor 1 and enters partly low pressure turbine 7 of a bottoming system to work. Condensed water from condenser 9 of the bottoming system is pressurized by pressure pump 10 and flows through the heat exchangers 4, 5 to become high temperature steam and to work in high pressure turbine 6. Exhaust gas thereof is mixed into the combustor 2. A mixture of methanol and water is supplied into reformer 13 to absorb heat from the heat exchanger 4 to be reformed into $H_2$ and $CO_2$, which is supplied into the combustor 2. A high temperature portion of the high temperature turbine 3 is cooled by cooling medium extracted from the compressor 1 outlet and high pressure turbine 6 outlet thereby reliability of the high temperature turbine 3 is enhanced.

12 Claims, 28 Drawing Sheets

BOTTOMING SYSTEM

COMBINED CYCLE POWER PLANT

This application is a Divisional application of Ser. No. 09/285,066, filed Apr. 2, 1999 (U.S. Pat. No. 6,260,348).

BACKGROUND OF THE INVENTION

1. Field of the Invention

The present invention relates to a combined cycle power plant using fossil fuel including methanol and the like.

2. Description of the Prior Art

FIG. 28 is a diagrammatic view of a prior art combined cycle power plant, using pure oxygen as oxidizing agent and methane as fuel, which has been disclosed from the Graz Institute of Technology. In the figure, numeral 1 designates a compressor, which compresses a mixture gas of steam and carbon dioxide as working fluid to a pressure decided by an entire system optimization study. Numeral 2 designates a combustor, which is supplied with oxygen needed for an equivalent combustion of the methane as fuel to generate a high temperature high pressure combustion gas, wherein components of the combustion gas are carbon dioxide and steam. Numeral 3 designates a high temperature gas turbine, which expands the high temperature high pressure combustion gas to obtain a work. Numerals 4, 5 designate first and second heat exchangers, respectively, and a condensed water produced at a bottoming system from an exhaust gas of the high temperature gas turbine 3 extracted at a midpoint between the first and second heat exchangers 4, 5 is heated at the first and second heat exchangers 4, 5 to generate a high temperature high pressure steam. Numeral 6 designates a high pressure steam turbine, which expands the high temperature high pressure steam generated at the first and second heat exchangers 4, 5 approximately to an inlet pressure of the combustor 2 to obtain a work as well as to send the steam so expanded to be mixed into an inlet of the combustor 2. Remaining exhaust steam from the high temperature gas turbine 3 which has passed through the first and second heat exchangers 4, 5 with its temperature having been reduced returns to an inlet of the compressor 1.

Numeral 7 designates a low pressure turbine, which expands the combustion gas extracted at the midpoint between the first and second heat exchangers 4, 5 approximately to a vacuum to obtain a work. Numeral 8 designates a carbon dioxide compressor (vacuum pump), which compresses the mixture gas the containing the entire amount of the carbon dioxide generated at the combustor 2 approximately to the atmospheric pressure to thereby discharge the carbon dioxide as a combustion-generated product outside of the system. Numeral 9 designates a condenser, in which an outlet gas of the low pressure turbine 7 which has been pressure-reduced by the carbon dioxide compressor (vacuum pump) 8 is heat-exchanged by the sea water or the like to be temperature-reduced so that the steam is liquefied. The liquefied water is pressurized by a pressure pump 10 to be fed into the first and second heat exchangers 4, 5 to thereby become the high temperature high pressure steam. The steam as the combustion-generated product which has been expanded at the low pressure turbine 7 is mostly liquefied to water at the condenser 9, and a remaining portion thereof becomes a drain in the process of being compressed by the vacuum pump 8 approximately to the atmospheric pressure to be discharged outside of the system.

In the prior art combined cycle power plant as mentioned above, while the high temperature combustion gas having the component of carbon dioxide and steam is obtained using the methane as fuel and oxygen, it is also possible to use a methanol ($CH_3OH$) fuel or other fossil fuels, but in this case, it has been a problem that the gross thermal efficiency is low.

SUMMARY OF THE INVENTION

In view of the problem in the prior art, therefore, it is an object of the present invention to improve the prior art combined cycle power plant using the methane fuel so that a turbine plant using methanol fuel or other fossil fuels is obtained, gross thermal efficiency thereof is more enhanced than that of the prior art combined cycle power plant and reliability of the turbine plant is also enhanced.

In order to attain said object, the present invention provides the following aspects (1) to (27):

(1) A turbine plant comprising a compressor for compressing a mixture gas of steam and carbon dioxide as a working fluid; a combustor for burning a fuel together with the working fluid from the compressor added with oxygen; a high temperature turbine for expanding a combustion gas from the combustor to obtain a work; a bottoming system for driving a low pressure turbine by an exhaust gas from the high temperature turbine to obtain a work; a heat exchanger for heating a condensed water from the bottoming system to a high temperature steam by a heat exchange with the exhaust gas from the high temperature turbine and for leading the exhaust gas (after it is used for the heat exchange) into an inlet of the compressor as the working fluid; and a high pressure turbine for expanding the high temperature steam of the bottoming system heated at the heat exchanger to obtain a work and for mixing the steam so expanded into the combustor. In addition, a reformer is provided for receiving a mixture of methanol and water to be reformed into hydrogen and carbon dioxide by heat absorbed at the heat exchanger and for supplying the hydrogen and carbon dioxide into the combustor as a fuel; and a high temperature turbine cooling system is provided for extracting the working fluid from an outlet of the compressor and an outlet of the high pressure turbine to be led into a high temperature portion of the high temperature turbine for cooling thereof as a cooling medium.

In the invention of aspect (1), the reformer can reform the mixture of methanol ($CH_3OH$) and water ($H_2O$) into hydrogen ($H_2$) and carbon dioxide ($CO_2$) so that the gross thermal efficiency is enhanced. Further, the high temperature portion of the high temperature turbine can be cooled by the high temperature turbine cooling system so that reliability of the high temperature turbine is enhanced.

(2) A turbine plant as mentioned in aspect (1) above, characterized in that the compressor comprises a low pressure compressor and a high pressure compressor. Between the low pressure compressor and the high pressure compressor, a passage is provided for flowing therethrough the working fluid via an intercooler. A portion of the condensed water from the bottoming system is mixed into the intercooler under pressure.

In the invention of aspect (2), in addition to the effect of the invention of aspect (1), the low pressure compressor outlet gas is temperature-reduced so that the compression power of the high pressure compressor is reduced so that the gross thermal efficiency is enhanced. Also, the high pressure compressor outlet temperature is reduced so that thereby reliability of the disc strength of the high pressure compressor outlet portion is enhanced. Further, the combustor inlet gas temperature is reduced so that reliability of the high temperature portion of the combustor is also enhanced.

(3) A turbine plant as mentioned in aspect (1) above, characterized in that there is provided between the outlet of the compressor and an inlet of the combustor a regenerative heat exchanger for elevating a combustor inlet gas temperature by a heat exchange between an outlet gas of the compressor and the exhaust gas from the high temperature turbine.

In the invention of aspect (3), in addition to the effect of the invention of aspect (1), there is provided the regenerative heat exchanger so that the combustor inlet gas temperature is elevated, the fuel flow rate is reduced and the gross thermal efficiency is enhanced.

(4) A turbine plant as mentioned in aspect (3) above, characterized in that the compressor comprises a low pressure compressor and a high pressure compressor. Between the low pressure compressor and the high pressure compressor, a passage is provided for flowing therethrough the working fluid via an intercooler, and a portion of the condensed water from the bottoming system is mixed into the intercooler under pressure.

In the invention of aspect (4), in addition to the effect of the invention of aspect (3), the low pressure compressor outlet gas is temperature-reduced and the compression power of the high pressure compressor is reduced so that the gross thermal efficiency is enhanced. Also, the high pressure compressor outlet temperature is reduced so that reliability of the disc strength of the high pressure compressor outlet portion is enhanced. Further, the combustor inlet gas temperature is reduced so that reliability of the high temperature portion of the combustor is enhanced.

(5) A turbine plant as mentioned in aspect (1) above, characterized in that a heated steam of the bottoming system from the heat exchanger is directly mixed into the combustor via a passage where the high pressure turbine is eliminated. The cooling medium of the high temperature turbine is extracted from the outlet of the compressor and a high temperature gas side of the heat exchanger.

In the invention of aspect (5), in addition to the effect of the invention of aspect (1), the high pressure turbine is eliminated so that the construction cost can be reduced.

(6) A turbine plant as mentioned in aspect (5) above, characterized in that the compressor comprises a low pressure compressor and a high pressure compressor. Between the low pressure compressor and the high pressure compressor, a passage is provided for flowing therethrough the working fluid via an intercooler, and a portion of the condensed water from the bottoming system is mixed into the intercooler under pressure.

In the invention of aspect (6), in addition to the effect of the invention of aspect (5), the low pressure compressor outlet gas is temperature-reduced and the compression power of the high pressure compressor is reduced so that the gross thermal efficiency is enhanced. Also, the high pressure compressor outlet temperature is reduced so that reliability of the disc strength of the high pressure compressor outlet portion is enhanced. Further, the combustor inlet gas temperature is reduced, so that reliability of the high temperature portion of the combustor is also enhanced.

(7) A turbine plant as mentioned in aspect (1) above, characterized in that the bottoming system comprises only a water condensing system having no low pressure turbine and no $CO_2$ compressor therein, and is constructed such that the condensed water from the water condensing system is partly led into the inlet of the compressor as the working fluid. The condensed water from the water condensing system is partly heat-exchanged with the exhaust gas from the high temperature turbine at the heat exchanger. The high temperature steam generated by the heat exchange is directly mixed into the combustor via a passage where the high pressure turbine is eliminated, and the exhaust gas from the high temperature turbine after so heat-exchanged is led into the water condensing system of the bottoming system. The high temperature turbine cooling system extracts the cooling medium from the outlet of the compressor and a high temperature gas side of the heat exchanger.

In the invention of aspect (7), in addition to the effect of the invention of aspect (1), the high pressure turbine, and the low pressure turbine and the $CO_2$ compressor of the bottoming system are eliminated so that the construction cost can be reduced largely. Further, the compressor inlet temperature is reduced, so that the power of the compressor is reduced and the gross thermal efficiency is enhanced.

(8) A turbine plant as mentioned in aspect (7) above, characterized in that the compressor comprises a low pressure compressor and a high pressure compressor. Between the low pressure compressor and the high pressure compressor, a passage is provided for flowing therethrough the working fluid via an intercooler, and a portion of the condensed water from the water condensing system is mixed into the intercooler under pressure.

In the invention of aspect (8), in addition to the effect of the invention of aspect (7), the low pressure compressor outlet gas is temperature-reduced and the compression power of the high pressure compressor is reduced so that the gross thermal efficiency is enhanced. Also, the high pressure compressor outlet temperature is reduced, so that reliability of the disc strength of the high pressure compressor outlet portion is enhanced. Further, the combustor inlet gas temperature is reduced, so that reliability of the high temperature portion of the combustor is enhanced.

(9) A turbine plant as mentioned in aspect (3) above, characterized in that the bottoming system comprises only a water condensing system having no low pressure turbine and no $CO_2$ compressor therein. The condensed water from the water condensing system is partly led into the inlet of the compressor as the working fluid, and the exhaust gas from the high temperature turbine after being heat-exchanged is led into the water condensing system.

In the invention of aspect (9), the low pressure turbine and the $CO_2$ compressor of the bottoming system are eliminated, so that the construction cost can be reduced more than the plant of the invention of aspect (3). Further, the compressor inlet temperature is reduced and the power of the compressor is reduced so that by the gross thermal efficiency is enhanced.

(10) A turbine plant as mentioned in aspect (9) above, characterized in that the compressor comprises a low pressure compressor and a high pressure compressor. Between the low pressure compressor and the high pressure compressor, a passage is provided for flowing therethrough the working fluid via an intercooler, and a portion of the condensed water from the water condensing system is mixed into the intercooler under pressure.

In the invention of aspect (10), in addition to the effect of the invention of aspect (9), the low pressure compressor outlet gas is temperature-reduced and the compression power of the high pressure compressor is reduced so that the gross thermal efficiency is enhanced. Also, the high pressure compressor outlet temperature is reduced, so that reliability of the disc strength of the high pressure compressor outlet portion is enhanced. Further, the combustor inlet gas temperature is reduced so that reliability of the high temperature portion of the combustor is enhanced.

(11) A turbine plant as mentioned in aspect (1) above, characterized in that the bottoming system comprises a water condensing system and a $CO_2$ compressor having no low pressure turbine therein. The condensed water from the water condensing system is partly led into the inlet of the compressor as the working fluid. The condensed water from the water condensing system is partly heat-exchanged with the exhaust gas from the high temperature turbine at the heat exchanger. The high temperature steam generated by the heat exchange is directly mixed into the combustor via a passage where the high pressure turbine is eliminated. The exhaust gas from the high temperature turbine after being heat-exchanged is led into the water condensing system, and the cooling medium of the high temperature turbine is extracted from the outlet of the compressor and a high temperature gas side of the heat exchanger.

In the invention of aspect (11), in addition to the effect of the invention of aspect (1), the high temperature turbine outlet pressure is reduced and the high temperature turbine outlet temperature is reduced, so that the anti-creep life of the final stage moving blade of the high temperature turbine can be elongated. Also, the high pressure turbine and the low pressure turbine are eliminated, so that the construction cost is reduced. Further, the compressor inlet temperature is reduced and the power of the compressor is reduced so that the gross thermal efficiency is enhanced.

(12) A turbine plant as mentioned in aspect (11) above, characterized in that the compressor comprises a low pressure compressor and a high pressure compressor. Between the low pressure compressor and the high pressure compressor, a passage is provided for flowing therethrough the working fluid via an intercooler, and a portion of the condensed water from the water condensing system is mixed into the intercooler under pressure.

In the invention of aspect (12), in addition to the effect of the invention of aspect (11), the low pressure compressor outlet gas is temperature-reduced and the compression power of the high pressure compressor is reduced so that the gross thermal efficiency is enhanced. Also, the high pressure compressor outlet. temperature is reduced, so that reliability of the disc strength of the high pressure compressor outlet portion is enhanced. Further, the combustor inlet gas temperature is reduced, so that reliability of the high temperature portion of the combustor is enhanced.

(13) A turbine plant as mentioned in aspect (3) above, characterized in that the bottoming system comprises a water condensing system and a $CO_2$ compressor having no low pressure turbine therein, and is constructed such that the condensed water from the bottoming system is partly led into the inlet of the compressor as the working fluid. The exhaust gas from the high temperature turbine after being heat-exchanged at the heat exchanger is led into a condenser of the bottoming system.

In the invention of aspect (13), in addition to the effect of the invention of aspect (3), the high temperature turbine outlet pressure is reduced and the high temperature turbine outlet temperature is reduced so that the anti-creep life of the final stage moving blade of the high temperature turbine can be elongated. Also, the low pressure turbine is eliminated so that the construction cost is reduced. Further, the compressor inlet temperature is reduced and the power of the compressor is reduced so that the gross thermal efficiency is enhanced.

(14) A turbine plant as mentioned in aspect (13) above, characterized in that the compressor comprises a low pressure compressor and a high pressure compressor. Between the low pressure compressor and the high pressure compressor, a passage is provided for flowing therethrough the working fluid via an intercooler, and a portion of the condensed water from the bottoming system is mixed into the intercooler under pressure.

In the invention of aspect (14), in addition to the effect of the invention of aspect (13), the low pressure compressor outlet gas is temperature-reduced and the compression power of the high pressure compressor is reduced so that the gross thermal efficiency is enhanced. Also, the high pressure compressor outlet temperature is reduced so that reliability of the disc strength of the high pressure compressor outlet portion is enhanced. Further, the combustor inlet gas temperature is reduced so that reliability of the high temperature portion of the combustor is enhanced.

(15) A turbine plant comprising a compressor for compressing a mixture gas of steam and carbon dioxide as a working fluid; a combustor for burning a fossil fuel including methanol together with the working fluid from the compressor added with oxygen; a high temperature turbine for expanding a combustion gas from the combustor to obtain a work; a bottoming system for driving a low pressure turbine by an exhaust gas from the high temperature turbine to obtain a work; a heat exchanger for heating a condensed water from the bottoming system to a high temperature steam by a heat exchange with the exhaust gas from the high temperature turbine and for leading the exhaust gas (after it is used for the heat exchange) into an inlet of the compressor as the working fluid; and a high pressure turbine for expanding the high temperature steam of the bottoming system heated at the heat exchanger to obtain a work and for mixing the steam so expanded into the combustor. The compressor comprises a low pressure compressor and a high pressure compressor and is constructed such that, between the low pressure compressor and the high pressure compressor, a passage is provided for flowing therethrough the working fluid via an intercooler. A portion of the condensed water from the bottoming system is mixed into the intercooler under pressure. A high temperature turbine cooling system is provided for extracting the working fluid from an outlet of the high pressure compressor and an outlet of the high pressure turbine to be led into a high temperature portion of the high temperature turbine for cooling thereof as a cooling medium.

In the invention of aspect (15), the low pressure compressor outlet gas is temperature-reduced and the compression power is reduced so that the gross thermal efficiency is enhanced and reliability of the disc strength of the high pressure compressor outlet portion is enhanced. Also, the combustor inlet gas temperature is reduced so that reliability of the high temperature portion of the combustor is enhanced. Further, by the high temperature turbine cooling system, reliability of the high temperature turbine is also enhanced. Also, in the invention of aspect (15), not only the methanol fuel but also other fossil fuels can be used, and the surplus gas generated at an iron making plant etc. or the coal gasified fuel will be effective.

(16) A turbine plant as in the prior art, characterized in that between the outlet of the compressor and an inlet of the combustor, a regenerative heat exchanger is provided for elevating a combustor inlet gas temperature by a heat exchange between an outlet gas of the compressor and the exhaust gas from the high temperature turbine. A high temperature turbine cooling system is provided for extracting the working fluid from an outlet of the compressor and an outlet of the high pressure turbine to be led into a high temperature portion of the high temperature turbine for cooling thereof as a cooling medium.

In the invention of aspect (16), the combustor inlet gas temperature is elevated by the regenerative heat exchanger and the fuel flow rate is reduced so that the gross thermal efficiency is enhanced. Also, the high temperature portion of the high temperature turbine is cooled by the high temperature turbine cooling system so that reliability of the high temperature turbine is enhanced. Also, in the invention of aspect (16), not only the methanol fuel but also other fossil fuels can be used, and the surplus gas generated at an iron making plant etc. or the coal gasified gas will be effective.

(17) A turbine plant as mentioned in aspect (16) above, characterized in that the compressor comprises a low pressure compressor and a high pressure compressor. Between the low pressure compressor and the high pressure compressor, a passage is provided for flowing therethrough the working fluid via an intercooler, and a portion of the condensed water from the bottoming system is mixed into the intercooler under pressure.

In the invention of aspect (17), in addition to the effect of the invention of aspect (16), the low pressure compressor outlet gas is temperature-reduced and the compression power of the high pressure compressor is reduced so that the gross thermal efficiency is enhanced. Also, the high pressure compressor outlet temperature is reduced so that reliability of the disc strength of the high pressure compressor outlet portion is enhanced. Further, the combustor inlet gas temperature is reduced so that reliability of the high temperature portion of the combustor is enhanced.

(18) A turbine plant as in the prior art, characterized in that a heated steam of the bottoming system from the heat exchanger is directly mixed into the combustor via a passage where the high pressure turbine is eliminated. A high temperature turbine cooling system for extracting the working fluid from an outlet of the compressor and a high temperature gas side of the heat exchanger to be led into a high temperature portion of the high temperature turbine for cooling thereof as a cooling medium.

In the invention of aspect (18), the high pressure turbine is eliminated so that the construction cost can be reduced more than the prior art. Also, the high temperature portion of the high temperature turbine is cooled by the high temperature turbine cooling system so that reliability of the high temperature turbine is enhanced. Also, in the invention of aspect (18), not only the methanol fuel but also other fossil fuels can be used, and the surplus gas generated at an iron making plant etc. or the coal gasified fuel will be effective.

(19) A turbine plant as mentioned in aspect (18) above, characterized in that the compressor comprises a low pressure compressor and a high pressure compressor. Between the low pressure compressor and the high pressure compressor, a passage is provided for flowing therethrough the working fluid via an intercooler, and a portion of the condensed water from the bottoming system is mixed into the intercooler under pressure.

In the invention of aspect (19), in addition to the effect of the invention of aspect (18), the low pressure compressor outlet gas is temperature-reduced and the compression power of the high pressure compressor is reduced so that the gross thermal efficiency is enhanced. Also, the high pressure compressor outlet temperature is reduced so that reliability of the disc strength of the high pressure compressor outlet portion is enhanced. Further, the combustor inlet gas temperature is reduced so that reliability of the high temperature portion of the combustor is enhanced.

(20) A turbine plant as in the prior art, characterized in that the bottoming system comprises only a water condensing system having no low pressure turbine and no $CO_2$ compressor therein, and is constructed such that the condensed water from the water condensing system is partly led into the inlet of the compressor as the working fluid. The condensed water from the water condensing system is partly heat-exchanged with the exhaust gas from the high temperature turbine at the heat exchanger. The high temperature steam generated by the heat exchange is directly mixed into the combustor via a passage where the high pressure turbine is eliminated, and the exhaust gas from the high temperature turbine after so heat-exchanged is led into the water condensing system of the bottoming system. A high temperature turbine cooling system is provided for extracting the working fluid from an outlet of the compressor and a high temperature gas side of the heat exchanger to be led into a high temperature portion of the high temperature turbine for cooling thereof as a cooling medium.

In the invention of aspect (20), the high pressure turbine, the low pressure turbine and the $CO_2$ compressor are eliminated so that the construction cost can be reduced more than the prior art plant. Also, the compressor inlet temperature is reduced and the power of the compressor is reduced so that the gross thermal efficiency is enhanced. Also, the high temperature portion of the high temperature turbine is cooled effectively by the high temperature turbine cooling system so that reliability of the high temperature turbine is enhanced. Also, in the invention of aspect (20), not only the methanol fuel but also other fossil fuels can be used, and the surplus gas generated at an iron making plant etc. or the coal gasified fuel will be effective.

(21) A turbine plant as mentioned in aspect (20) above, characterized in that the compressor comprises a low pressure compressor and a high pressure compressor. Between the low pressure compressor and the high pressure compressor, a passage is provided for flowing therethrough the working fluid via an intercooler, and a portion of the condensed water from the bottoming system is mixed into the intercooler under pressure.

In the invention of aspect (21), in addition to the effect of the invention of aspect (20), the low pressure compressor outlet gas is temperature-reduced and the compression power of the high pressure compressor is reduced so that the gross thermal efficiency is enhanced. Also, the high pressure compressor outlet temperature is reduced so that reliability of the disc strength of the high pressure compressor outlet portion is enhanced. Further, the combustor inlet gas temperature is reduced so that reliability of the high temperature portion of the combustor is enhanced.

(22) A turbine plant as mentioned in aspect (16) above, characterized in that the bottoming system comprises only a water condensing system having no low pressure turbine and no $CO_2$ compressor therein, and is constructed such that the condensed water from the bottoming system is partly led into the inlet of the compressor as the working fluid. The exhaust gas from the high temperature turbine after being heat-exchanged at the heat exchanger is led into a condenser of the bottoming system.

In the invention of aspect (22), in addition to the effect of the invention of aspect (16), the low pressure turbine and the $CO_2$ compressor are eliminated so that the construction cost can be reduced more than the invention of aspect (16). Also, the compressor inlet temperature is reduced and the power of the compressor is reduced so that the gross thermal efficiency is enhanced.

(23) A turbine plant as mentioned in aspect (22) above, characterized in that the compressor comprises a low pressure compressor and a high pressure compressor. Between the low pressure compressor and the high pressure compressor, a passage is provided for flowing therethrough the working fluid via an intercooler, and a portion of the condensed water from the bottoming system is mixed into the intercooler under pressure.

In the invention of aspect (23), in addition to the effect of the invention of aspect (22), the low pressure compressor outlet gas is temperature-reduced and the compression power of the high pressure compressor is reduced so that the gross thermal efficiency is enhanced. Also, the high pressure compressor outlet temperature is reduced so that reliability of the disc strength of the high pressure compressor outlet portion is enhanced. Further, the combustor inlet gas temperature is reduced so that reliability of the high temperature portion of the combustor is enhanced.

(24) A turbine plant as in the prior art, characterized in that the bottoming system comprises a water condensing system and a $CO_2$ compressor having no low pressure turbine therein, and is constructed such that the condensed water from the water condensing system is partly led into the inlet of the compressor as the working fluid. The condensed water from the water condensing system is partly heat-exchanged with the exhaust gas from the high temperature turbine at the heat exchanger. The high temperature steam generated by the heat exchange is directly mixed into the combustor via a passage where the high pressure turbine is eliminated, and the exhaust gas from the high temperature turbine after being heat-exchanged is led into the water condensing system of the bottoming system. A high temperature turbine cooling system is provided for extracting the working fluid from an outlet of the compressor and a high temperature gas side of the heat exchanger to be led into a high temperature portion of the high temperature turbine for cooling thereof as a cooling medium.

In the invention of aspect (24), the high temperature turbine outlet pressure is reduced and the high temperature turbine outlet temperature is reduced so that the anti-creep life of the final stage moving blade of the high temperature turbine can be elongated. Also, the high pressure turbine and the low pressure turbine are eliminated so that the construction cost can be reduced. Also, the high temperature portion of the high temperature turbine is cooled by the high temperature turbine cooling system so that reliability of the high temperature turbine is enhanced.

Further, in the invention of aspect (24), not only the methanol fuel but also other fossil fuels can be used, and the surplus gas generated at an iron making plant etc. or the coal gasified fuel will be effective.

(25) A turbine plant as mentioned in aspect (24) above, characterized in that the compressor comprises a low pressure compressor and a high pressure compressor. Between the low pressure compressor and said high pressure compressor, a passage is provided for flowing therethrough the working fluid via an intercooler. A portion of the condensed water from the bottoming system is mixed into the intercooler under pressure.

In the invention of aspect (25), in addition to the effect of the invention of aspect (24), the low pressure compressor outlet gas is temperature-reduced and the compression power of the high pressure compressor is reduced so that the gross thermal efficiency is enhanced. Also, the high pressure compressor outlet temperature is reduced so that reliability of the disc strength of the high pressure compressor outlet portion is enhanced. Further, the combustor inlet gas temperature is reduced so that reliability of the high temperature portion of the combustor is enhanced.

(26) A turbine plant as mentioned in aspect (16) above, characterized in that the bottoming system comprises a water condensing system and a $CO_2$ compressor having no low pressure turbine therein; the condensed water from the water condensing system is partly led into the inlet of the compressor as the working fluid and the exhaust gas from the high temperature turbine after being heat-exchanged at the heat exchanger is led into the water condensing system.

In the invention of aspect (26), in addition to the effect of the invention of aspect (16), the high temperature turbine outlet pressure is reduced and the high temperature turbine outlet temperature is reduced so that the anti-creep life of the final stage moving blade of the high temperature turbine can be elongated. Also, the low pressure turbine is eliminated so that the construction cost is reduced. Further, the compressor inlet temperature is reduced and the power of the compressor is reduced so that the gross thermal efficiency is enhanced.

(27) A turbine plant as mentioned in aspect (26) above, characterized in that the compressor comprises a low pressure compressor and a high pressure compressor. Between the low pressure compressor and the high pressure compressor, a passage is provided for flowing therethrough the working fluid via an intercooler, and a portion of the condensed water from the bottoming system is mixed into the intercooler under pressure.

In the invention of aspect (27), in addition to the effect of the invention of aspect (26), the low pressure compressor outlet gas is temperature-reduced and the compression power of the high pressure compressor is reduced so that the gross thermal efficiency is enhanced. Also, the high pressure compressor outlet temperature is reduced so that reliability of the disc strength of the high pressure compressor outlet portion is enhanced. Further, the combustor inlet gas temperature is reduced so that reliability of the high temperature portion of the combustor is enhanced.

As a summary of the effects obtained by the present invention described above in (1) to aspect (27), as compared with the prior art turbine plant, the herebelow mentioned remarkable effects can be obtained: enhancement of the gross thermal efficiency, enhancement of the reliability of the high temperature turbine by cooling of the high temperature turbine, enhancement of the reliability of the combustor high temperature portion by reduction of the combustor inlet gas temperature, enhancement of the disc strength of the high pressure compressor outlet portion, and reduction of the construction cost by elimination of the low pressure turbine and/or the high pressure turbine, etc.

Also, the present invention is effective not only for the methanol fuel but also for other fossil fuels including the surplus gas generated at an iron making plant and the coal gasified fuel.

DESCRIPTION OF THE PREFERRED EMBODIMENTS

Figure 1:
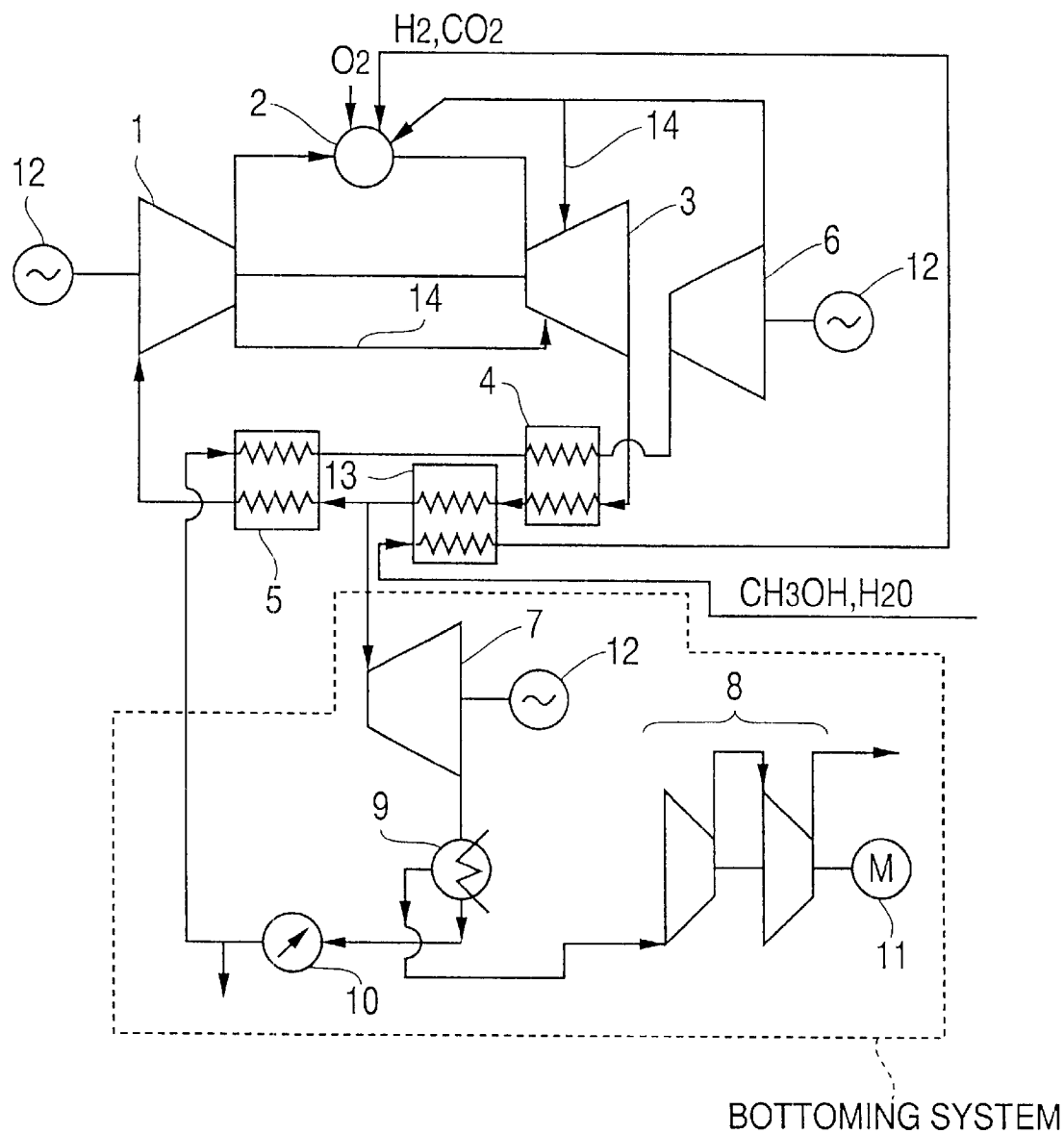
FIG. 1 is a diagrammatic view of a turbine plant of a first embodiment according to the present invention.

Herebelow, embodiments according to the present invention will be described concretely with reference to figures. FIG. 1 is a diagrammatic view of a turbine plant of a first embodiment according to the present invention, wherein a turbine plant using a methanol fuel is shown. The turbine plant using the methanol fuel of the present embodiment comprises a reformer 13 in addition to the system in the prior art shown in FIG. 28, and the methanol fuel is supplied into the combustor 2 via the reformer 13.

In the reformer 13, a mixture of the methanol ($CH_3OH$) as fuel and water ($H_2O$) can be reformed into hydrogen ($H_2O$) and carbon dioxide ($CO_2$) by heat of absorption Q at the reformer 13, wherein the following reaction formula takes place in the reformer 13:

$$CH_3OH + H_2O + Q \rightarrow H_2 + CO_2$$

In this reaction formula, the heat of absorption Q is given by heat exchange at the reformer 13. Thereby, the same effect is obtained as that of a fuel heating system in which fuel is heated so that fuel flow rate thereof is reduced and gross thermal efficiency thereof is enhanced in a gas turbine using an ordinary natural gas as fuel. Hence, by the reforming, the gross thermal efficiency can be enhanced.

Also, in the combustor 2, a mixture gas of the hydrogen ($H_2$) and carbon dioxide generated by the reforming process reacts on oxygen which is necessary for an equivalent combustion of the hydrogen to become a high temperature mixture gas of steam ($H_2O$) and carbon dioxide ($CO_2$). This reaction is as follows, wherein working fluid is the same as that of the prior art shown in FIG. 28:

$$H_2 + CO_2 + \tfrac{1}{2} 993O_2 \rightarrow H_2O + CO_2$$

Further, in order to cool a high temperature portion of the high temperature turbine 3, cooling medium 14 (mixture gas of steam and carbon dioxide) used for cooling the high temperature turbine 3 is extracted from an outlet of the high pressure turbine 6 and from an outlet of the compressor 1. Construction of other portions is the same as that of the prior art shown in FIG. 28.

According to the present first embodiment, the reformer 13 can reform the mixture of methanol ($CH_3OH$) as fuel and water ($H_2O$) into hydrogen ($H_2$) and carbon dioxide ($CO_2$) by the heat of absorption Q there. The heat of absorption Q at the reformer 13 has the same effect as the fuel heating system in which fuel is heated so that fuel flow rate thereof is reduced and the gross thermal efficiency is thereby enhanced in a gas turbine using ordinary natural gas as fuel. Hence, the effect to enhance the gross thermal efficiency can be obtained.

Also, the cooling medium 14 (mixture gas of steam and carbon dioxide) is extracted from the outlet of the high pressure turbine 6 and the outlet of the compressor 1 so that so as to cool the high temperature portion of the high temperature turbine 3 and to enhance the reliability of the high temperature turbine 3.

Figure 2:
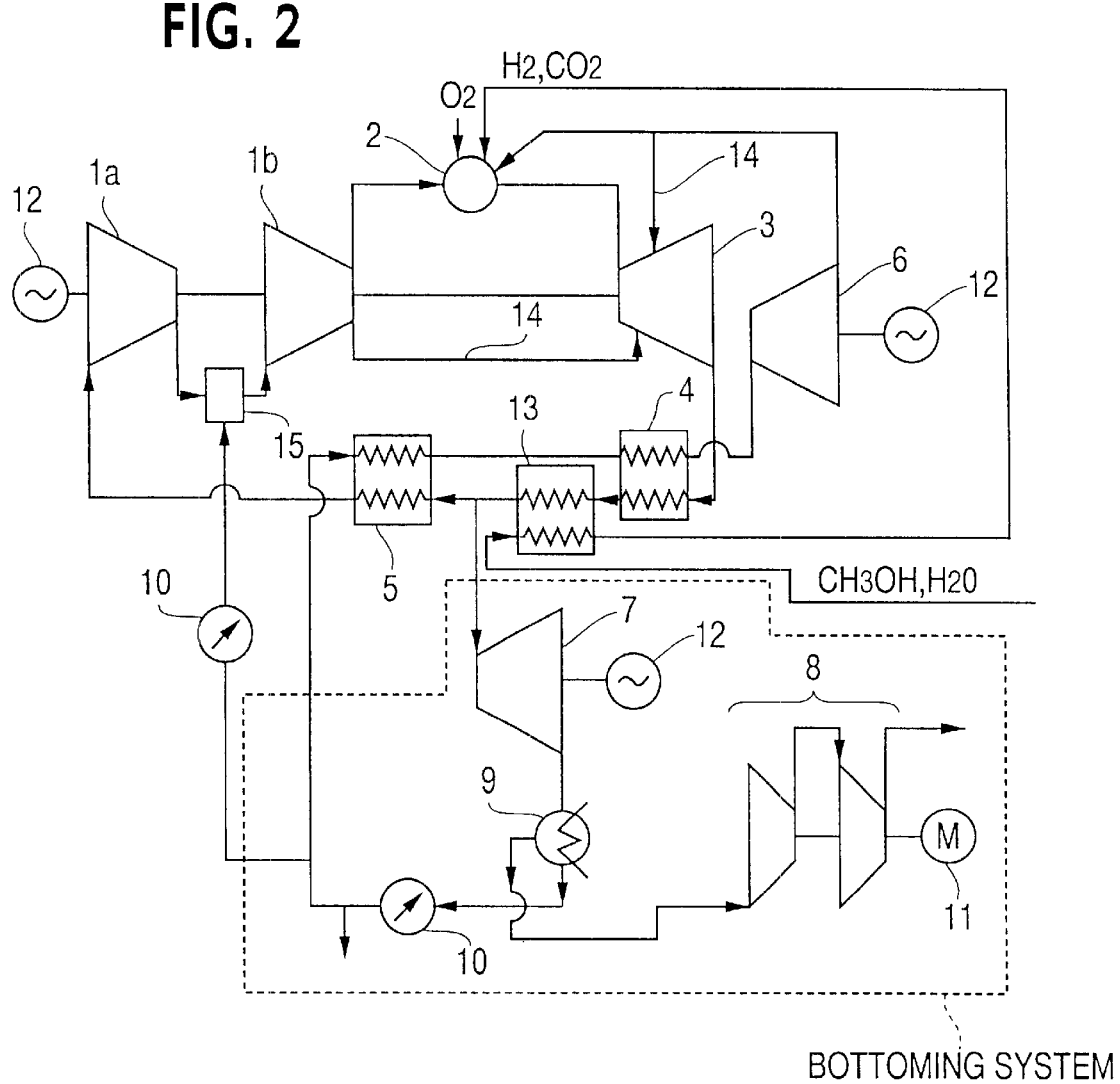
FIG. 2 is a diagrammatic view of a turbine plant of a second embodiment according to the present invention.

FIG. 2 is a diagrammatic view of a turbine plant of a second embodiment according to the present invention. In the second embodiment shown there, the compressor 1 of the first embodiment shown in FIG. 1 is divided into a low pressure compressor 1a and a high pressure compressor 1b, and an intercooler 15 is provided therebetween. Other portions of the system are the same as that shown in FIG. 1 with description thereof being omitted.

In this intercooler 15, a low pressure compressor 1a outlet gas (a high pressure compressor 1b inlet gas) is mixed with the pressurized water which has been pressurized approximately to a low pressure compressor 1a outlet pressure by the pressure pump 10 to be temperature-reduced so that a compression power of the high pressure compressor 1b is reduced and a high pressure compressor 1b outlet temperature is reduced. Thus, reliability of a disc strength of a high pressure compressor 1b outlet portion is enhanced, and because a combustor 2 inlet gas temperature is being reduced, reliability of the high temperature portion of the combustor 2 can be enhanced.

According to the present second embodiment, the low pressure compressor 1a outlet gas (the high pressure compressor 1b inlet gas) is temperature-reduced. Thus, the compression power of the high pressure compressor 1b can be reduced and the gross thermal efficiency can be enhanced. Also, the high pressure compressor 1b outlet temperature is reduced so that reliability of the disc strength of the high pressure compressor 1b outlet portion can be enhanced. Further, the combustor 2 inlet gas temperature is reduced so as to enhance the reliability of the high temperature portion of the combustor 2. Other effects of the second embodiment are the same as that of the first embodiment.

Figure 3:
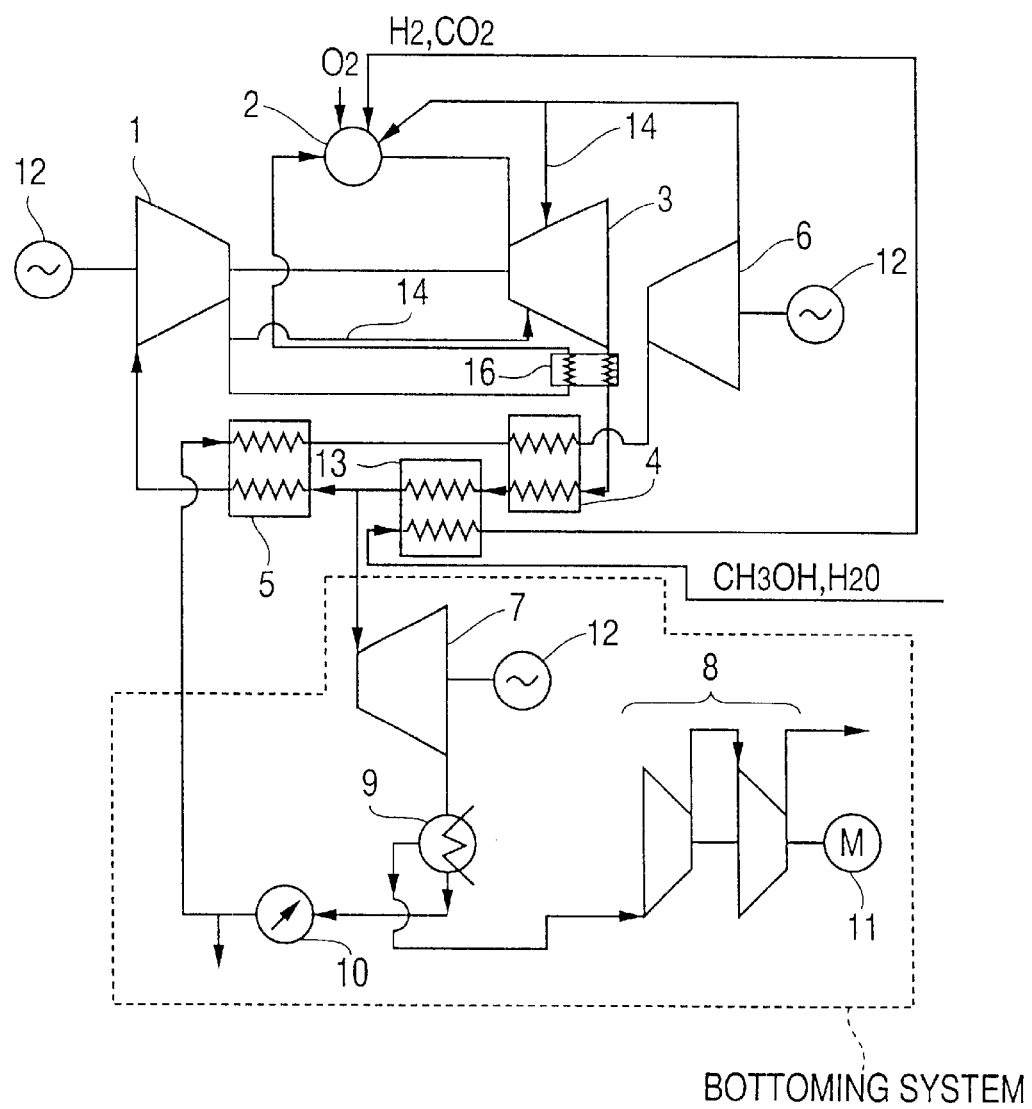
FIG. 3 is a diagrammatic view of a turbine plant of a third embodiment according to the present invention.

FIG. 3 is a diagrammatic view of a turbine plant of a third embodiment according to the present invention. In the present third embodiment, as compared with the first embodiment shown in FIG. 1, a regenerative heat exchanger 16 is provided on a downstream side of the high temperature turbine 3 so that a compressor 1 outlet gas is heat-exchanged with a high temperature turbine 3 exhaust gas. Thus, a combustor 2 inlet gas temperature is elevated, fuel flow rate is reduced and the gross thermal efficiency is enhanced. Construction of other portions is the same as that shown in FIG. 1 with description thereof being omitted.

According to the present third embodiment, by the regenerative heat exchanger 16 being provided, the combustor 2 inlet gas temperature is elevated more than in the first embodiment of FIG. 1, the fuel flow rate is reduced further and the further enhancement of the gross thermal efficiency can be obtained. Other effects of the third embodiment are the same as that of the first embodiment.

Figure 4:
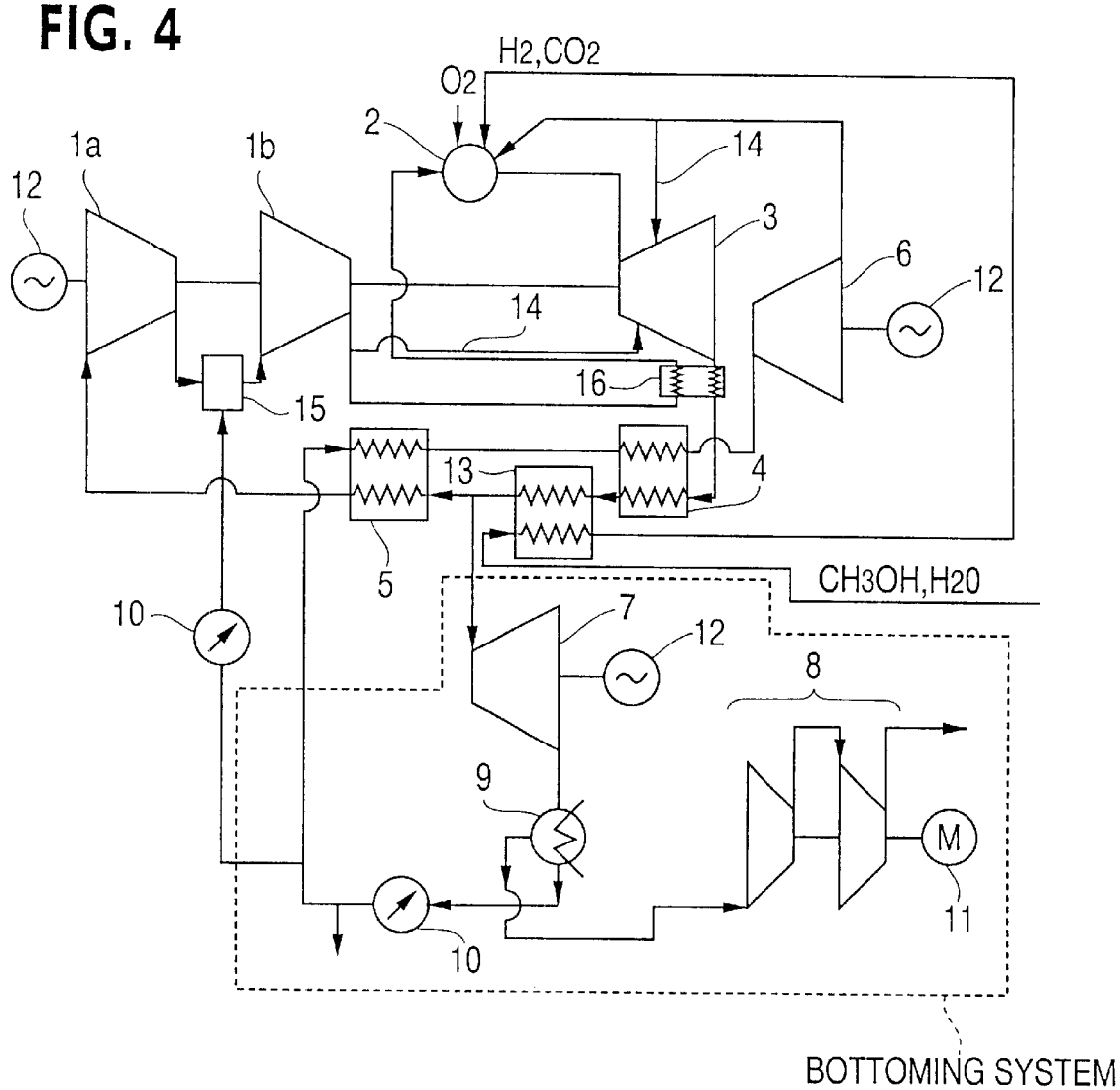
FIG. 4 is a diagrammatic view of a turbine plant of a fourth embodiment according to the present invention.

FIG. 4 is a diagrammatic view of a turbine plant of a fourth embodiment according to the present invention. In the present fourth embodiment, the compressor 1 of the third embodiment shown in FIG. 3 is divided into a low pressure compressor 1a and a high pressure compressor 1b, and an intercooler 15 is provided therebetween.

In this intercooler 15, a low pressure compressor 1a outlet gas (a high pressure compressor 1b inlet gas) is mixed with the pressurized water which has been pressurized approximately to a low pressure compressor 1a outlet pressure by the pressure pump 10 to be temperature-reduced so that a compression power of the high pressure compressor 1b is reduced and a high pressure compressor 1b outlet temperature is reduced. Thus, reliability of a disc strength of a high pressure compressor 1b outlet portion is enhanced and also, because a combustor 2 inlet gas temperature is reduced, reliability of the high temperature portion of the combustor 2 can be enhanced. Construction of other portions is the same as that of the third embodiment with description thereof being omitted.

According to the present fourth embodiment, as mentioned above, the effects are to reduce the low pressure compressor 1a outlet gas temperature, to reduce the compression power of the high pressure compressor 1b and to enhance the gross thermal efficiency. Also, reduction of the high pressure compressor 1b outlet temperature and enhancement of the reliability of the disc strength of the high pressure compressor 1b outlet portion can be obtained. Further, the effect to enhance the reliability of the high temperature portion of the combustor 2 can be obtained. Other effects of the fourth embodiment are the same as that of the third embodiment.

Figure 5:
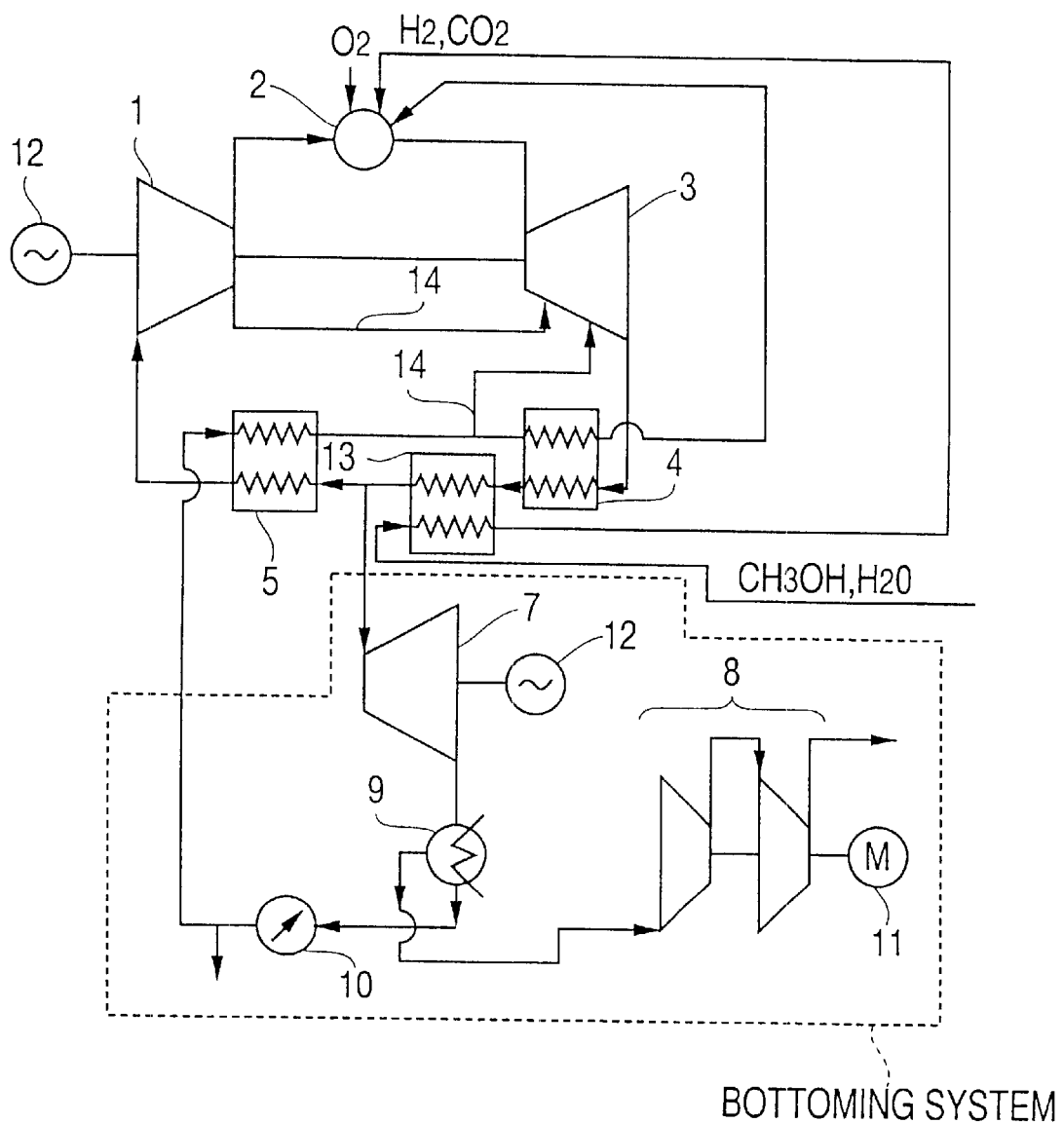
FIG. 5 is a diagrammatic view of a turbine plant of a fifth embodiment according to the present invention.

FIG. 5 is a diagrammatic view of a turbine plant of a fifth embodiment according to the present invention. In the present fifth embodiment, the high pressure turbine 6 of the first embodiment shown in FIG. 1 is eliminated so that construction cost thereof is reduced. Thereby, the high temperature turbine cooling medium 14 which has been extracted from the high pressure turbine 6 outlet in the first embodiment becomes high temperature. Hence, a modification in the construction is added so that the cooling medium 14 is extracted from a high temperature gas side of the heat exchangers 4, 5. Construction of other portions is the same as that shown in FIG. 1 with a description thereof being omitted.

According to the present fifth embodiment, the high pressure turbine 6 of the first embodiment shown in FIG. 1 is eliminated so that reduction of the construction cost can be obtained. Other effects of the fifth embodiment are the same as that of the first embodiment.

Figure 6:
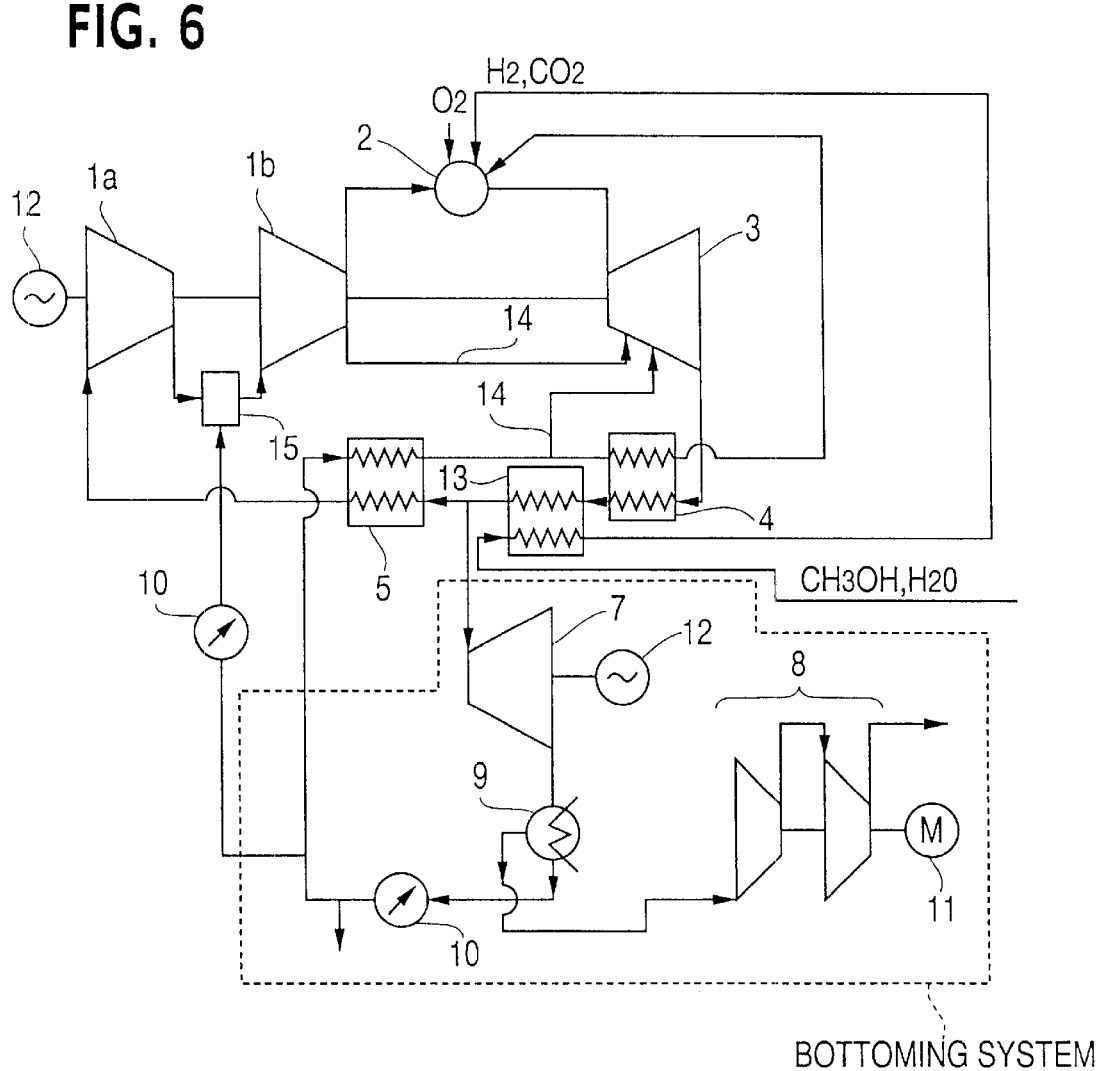
FIG. 6 is a diagrammatic view of a turbine plant of a sixth embodiment according to the present invention.

FIG. 6 is a diagrammatic view of a turbine plant of a sixth embodiment according to the present invention. In the present sixth embodiment, the compressor 1 of the fifth embodiment shown in FIG. 5 is divided into a low pressure compressor 1a and a high pressure compressor 1b, and an intercooler 15 is provided therebetween. In this intercooler 15, a low pressure compressor 1a outlet gas (a high pressure compressor 1b inlet gas) is mixed with the pressurized water which has been pressurized approximately to a low pressure compressor 1a outlet pressure by the pressure pump 10 to be temperature-reduced so that a compression power of the high pressure compressor 1b is reduced and a high pressure compressor 1b outlet temperature is reduced. Thus, reliability of a disc strength of a high pressure compressor 1b outlet portion is enhanced, and because combustor 2 inlet gas temperature is being reduced, reliability of the high temperature portion of the combustor 2 can be enhanced. Construction of other portions is the same as that of the fifth embodiment with description thereof being omitted.

According to the present sixth embodiment, as mentioned above, the effects are to reduce the low pressure compressor 1a outlet gas temperature, to reduce the compression power of the high pressure compressor 1b and to enhance the gross thermal efficiency. Also, the reduction of the high pressure compressor 1b outlet temperature and the enhancement of the reliability of the disc strength of the high pressure compressor 1b outlet portion can be obtained. Further, the enhancement of the reliability of the high temperature portion of the combustor 2 can be obtained. Other effects of the sixth embodiment are the same as that of the fifth embodiment.

Figure 7:
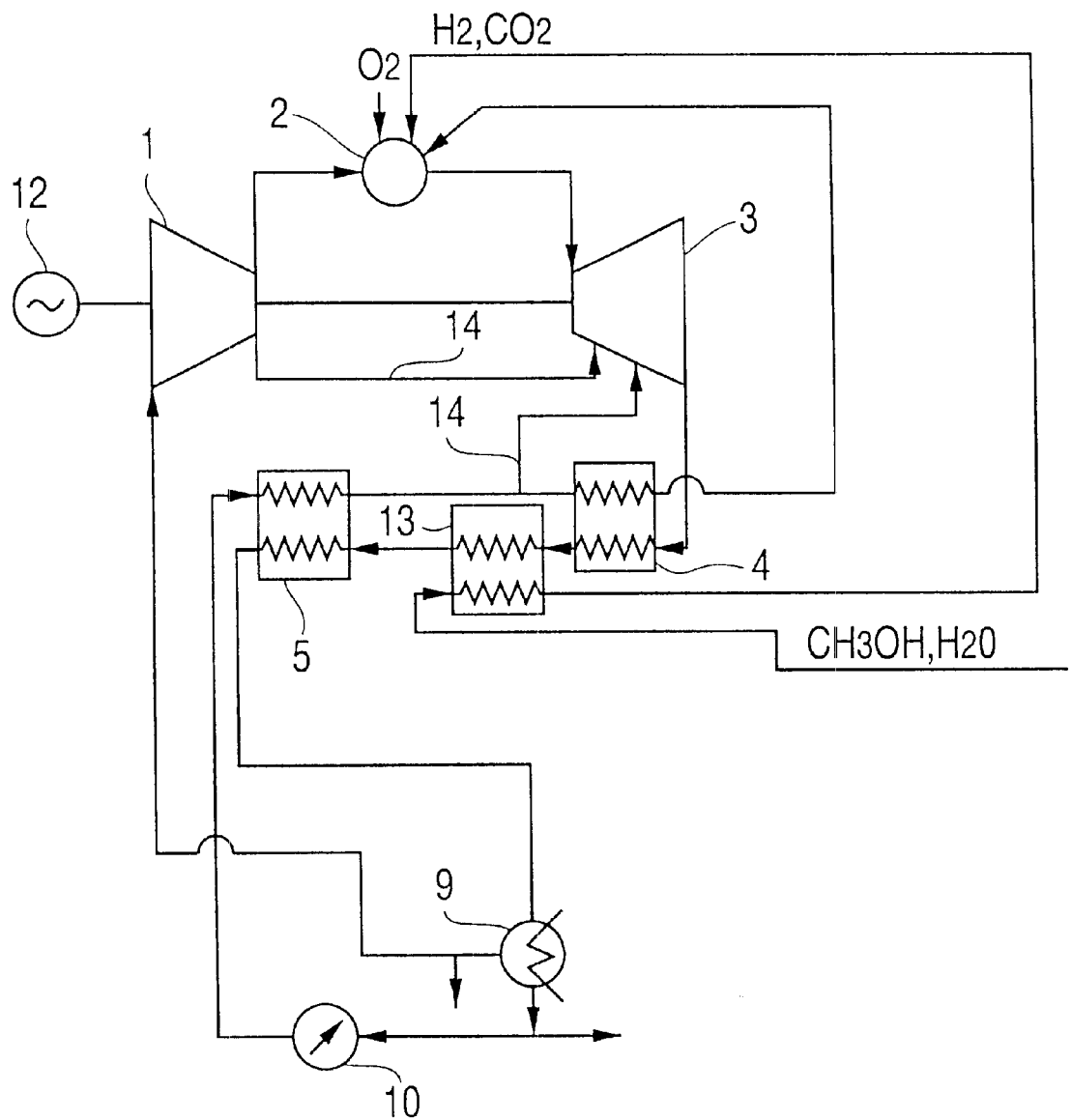
FIG. 7 is a diagrammatic view of a turbine plant of a seventh embodiment according to the present invention.

FIG. 7 is a diagrammatic view of a turbine plant of a seventh embodiment according to the present invention. In the present seventh embodiment, as compared with the first embodiment shown in FIG. 1, the high pressure turbine 6, and the low pressure turbine 7 and $CO_2$ compressor 8 with motor 11 of the bottoming system are eliminated so that construction cost thereof is reduced. Thereby, the high temperature turbine cooling medium 14 which has been extracted from the high pressure turbine 6 outlet in the first embodiment becomes high temperature. Hence, a modification in the construction is added so that the cooling medium 14 is extracted from a high temperature gas side of the heat exchangers 4, 5. Also, a supply system to the condenser 9 is modified so that supply therefor is done from a heat exchanger 5 outlet. Thus, a supply line to the compressor 1 is modified so that supply therefor is done from a condenser 9 outlet. Construction of other portions are the same as that of the first embodiment shown in FIG. 1.

According to the present seventh embodiment, the high pressure turbine and the bottoming system are eliminated so as to reduce the construction cost. Also, the effect of reducing the compressor 1 inlet temperature, reducing the power of the compressor 1 and to enhance the gross thermal efficiency can be obtained. Other effect of the seventh embodiment is same as that of the first embodiment shown in FIG. 1.

Figure 8:
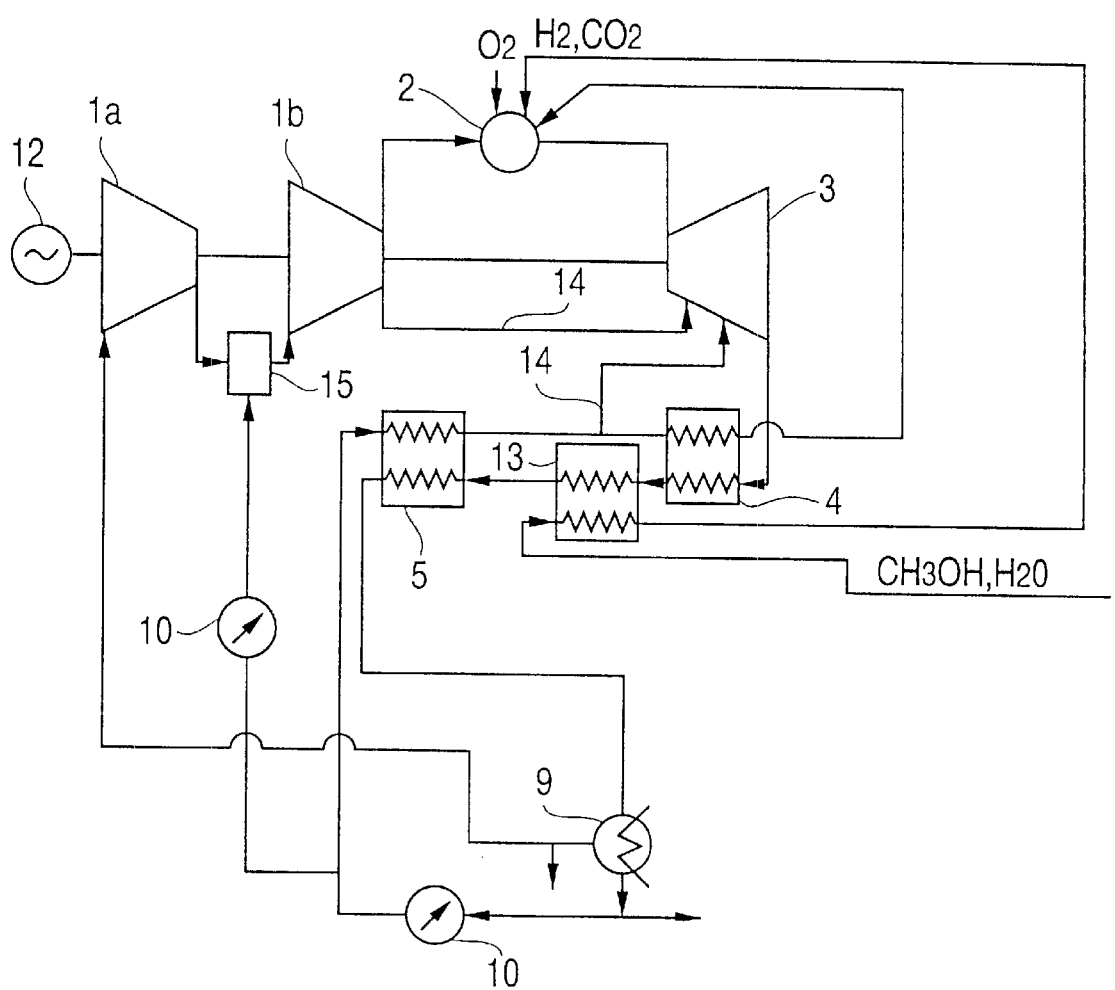
FIG. 8 is a diagrammatic view of a turbine plant of an eighth embodiment according to the present invention.

FIG. 8 is a diagrammatic view of a turbine plant of an eighth embodiment according to the present invention. In the present eighth embodiment, the compressor 1 of the seventh embodiment shown in FIG. 7 is divided into a low pressure compressor 1a and a high pressure compressor 1b, and an intercooler 15 is provided therebetween. In this intercooler 15, a low pressure compressor 1a outlet gas (a high pressure compressor 1b inlet gas) is mixed with the pressurized water which has been pressurized approximately to a low pressure compressor 1a outlet pressure by the pressure pump 10 to be temperature-reduced so that a compression power of the high pressure compressor 1b is reduced and a high pressure compressor 1b outlet temperature is reduced. Thus, reliability of a disc strength of a high pressure compressor 1b outlet portion is enhanced, and because a combustor 2 inlet gas temperature is reduced, reliability of the high temperature portion of the combustor 2 can be enhanced. Construction of other portions are the same as that of the seventh embodiment with description thereof being omitted.

According to the present eighth embodiment, as mentioned above, the effects are to reduce the low pressure compressor 1a outlet gas temperature, to reduce the compression power of the high pressure compressor 1b and to enhance the gross thermal efficiency. Also, reduction of the high pressure compressor 1b outlet temperature and the enhancement of the reliability of the disc strength of the high pressure compressor 1b outlet portion can be obtained. Further, the effect to enhance the reliability of the high temperature portion of the combustor 2 can be obtained. Other effects of the eighth embodiment are the same as that of the seventh embodiment.

Figure 9:
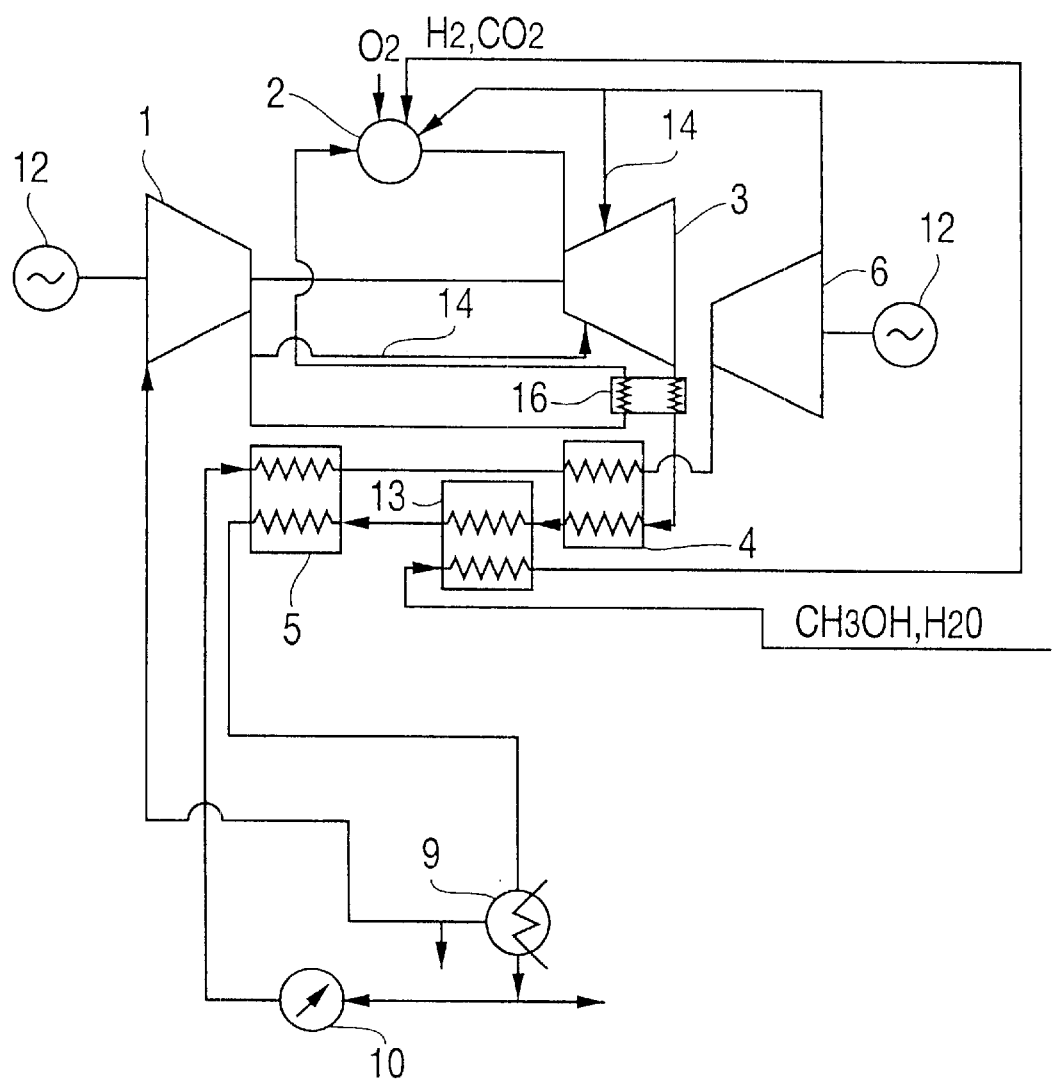
FIG. 9 is a diagrammatic view of a turbine plant of a ninth embodiment according to the present invention.

FIG. 9 is a diagrammatic view of a turbine plant of a ninth embodiment according to the present invention. In the present ninth embodiment, as compared with the third embodiment shown in FIG. 3, the low pressure turbine 7 and $CO_2$ compressor 8 with motor 11 of the bottoming system are eliminated so that construction cost thereof is reduced. Thereby, a supply system to the condenser 9 is modified so that supply therefor is provided from a heat exchanger 5 outlet. Thus, a supply line to the compressor 1 is modified so that supply therefor is provided from a condenser 9 outlet. Construction of other portions is the same as that of the third embodiment shown in FIG. 3.

According to the present ninth embodiment, the low pressure turbine 7 and the $CO_2$ compressor 8 with motor 11 of the bottoming system in the third embodiment are eliminated so that the reduction of the construction cost can be obtained. Also, the effect of reducing the compressor 1 inlet gas temperature, reducing the power of the compressor 1 and enhancing the gross thermal efficiency can be obtained. Other effects of the ninth embodiment are the same as that of the third embodiment shown in FIG. 3.

Figure 10:
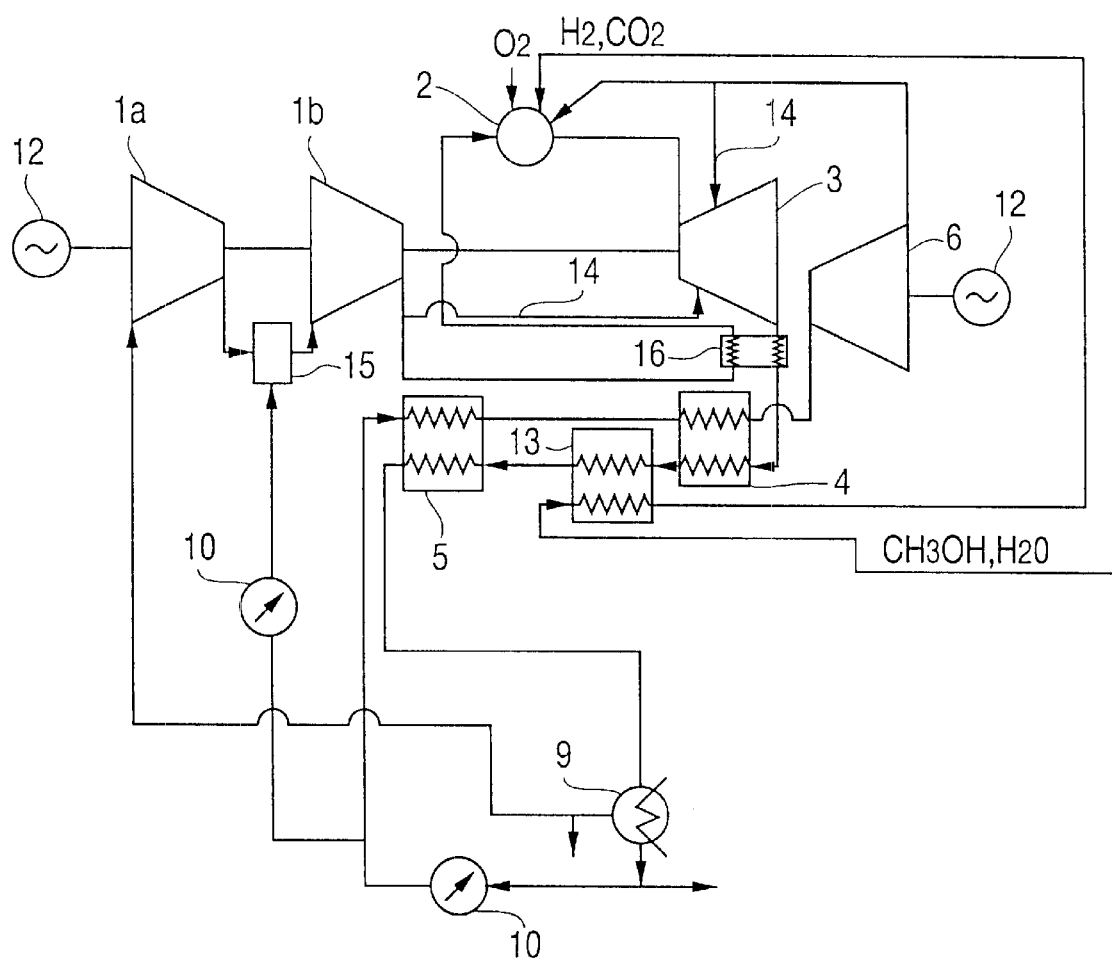
FIG. 10 is a diagrammatic view of a turbine plant of a tenth embodiment according to the present invention.

FIG. 10 is a diagrammatic view of a turbine plant of a tenth embodiment according to the present invention. In the present tenth embodiment, the compressor 1 of the ninth embodiment shown in FIG. 9 is divided into a low pressure compressor 1a and a high pressure compressor 1b, and an intercooler 15 is provided therebetween. In this intercooler 15, a low pressure compressor 1a outlet gas (a high pressure compressor 1b inlet gas) is mixed with the pressurized water which has been pressurized approximately to a low pressure compressor 1a outlet pressure by the pressure pump 10 to be temperature-reduced so that a compression power of the high pressure compressor 1b is reduced and a high pressure compressor 1b outlet temperature is reduced. Thus, reliability of a disc strength of a high pressure compressor 1b outlet portion is enhanced, and because a combustor 2 inlet gas temperature is reduced, reliability of the high temperature portion of the combustor 2 can be enhanced. Construction of other portions is the same as that of the ninth embodiment with description thereof being omitted.

According to the present tenth embodiment, as mentioned above, the effects are to reduce the low pressure compressor 1a outlet gas temperature, to reduce the compression power of the high pressure compressor 1b and to enhance the gross thermal efficiency. Also, the reduction of the high pressure compressor 1b outlet temperature and the enhancement of the reliability of the disc strength of the high pressure compressor 1b outlet portion can be obtained. Further, the enhancement of the reliability of the high temperature portion of the combustor 2 can be obtained. Other effects of the tenth embodiment are the same as that of the ninth embodiment.

Figure 11:
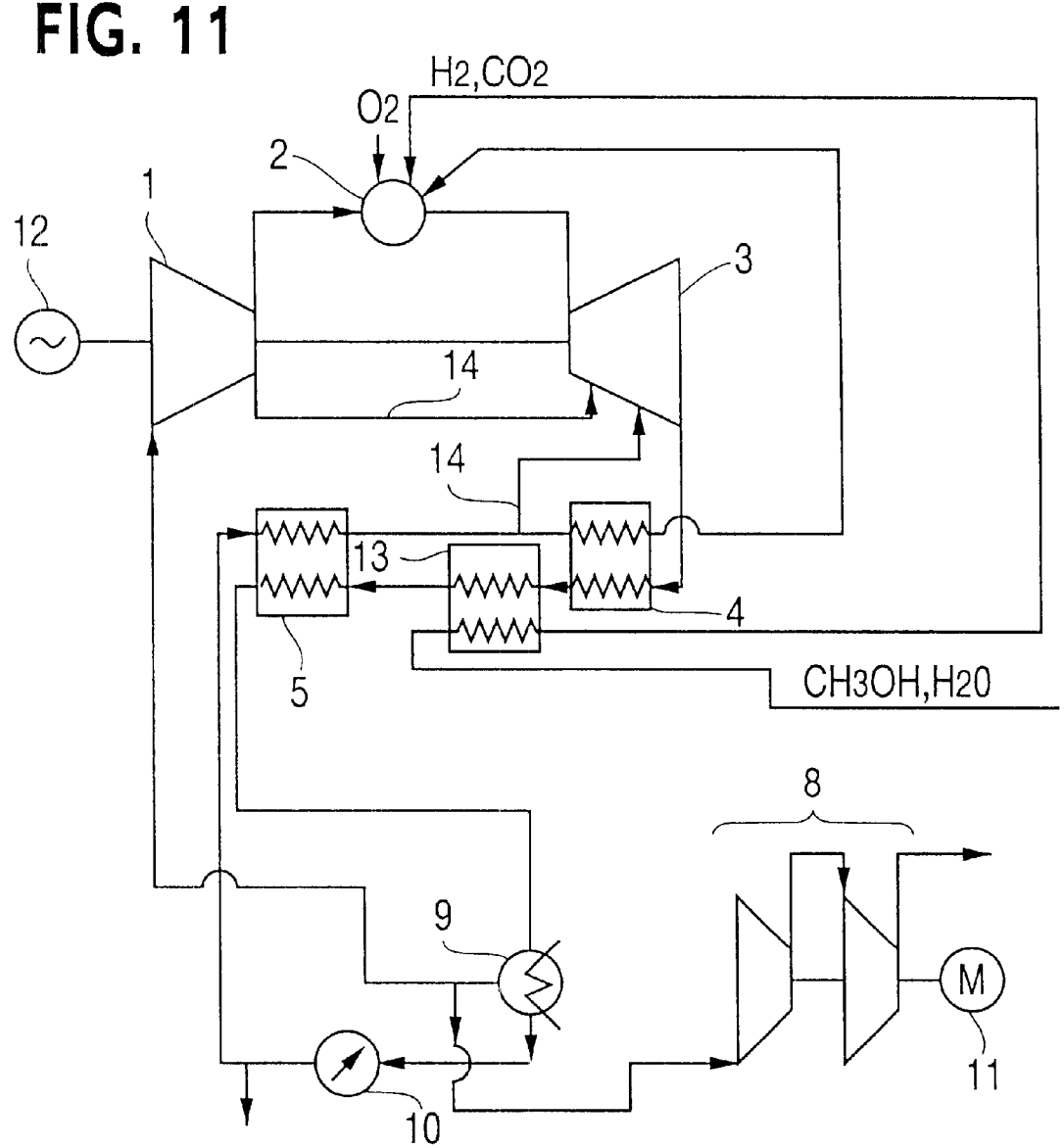
FIG. 11 is a diagrammatic view of a turbine plant of an eleventh embodiment according to the present invention.

FIG. 11 is a diagrammatic view of a turbine plant of an eleventh embodiment according to the present invention. In the present eleventh embodiment, as compared with the first embodiment shown in FIG. 1, outlet pressure of the high temperature turbine 3 is reduced and outlet temperature of the high temperature turbine 3 is also reduced. Thus, anti-creep life of a final stage moving blade of the high temperature turbine 3 is elongated. Also, the high pressure turbine 6 and the low pressure turbine 7 are eliminated so that construction cost thereof is reduced. Further, a supply system to the condenser 9 is modified so that supply therefor is provided from a heat exchanger 5 outlet. Thus, a supply line to the compressor 1 is modified so that supply therefor is provided from a condenser 9 outlet. Construction of other portions is the same as that of the first embodiment shown in FIG. 1.

According to the present eleventh embodiment, as mentioned above, an elongation of the anti-creep life of the final stage moving blade of the high temperature turbine 3 to a greater extent than the first embodiment can be obtained. Also, the high pressure turbine 6 and the low pressure turbine 7 are eliminated, so a reduction in the construction cost can be obtained. Further, a reduction in the compressor 1 inlet gas temperature, a reduction in the power of the compressor 1 and an enhancement in the gross thermal efficiency can be obtained. Other effects of the eleventh embodiment are the same as that of the first embodiment.

Figure 12:
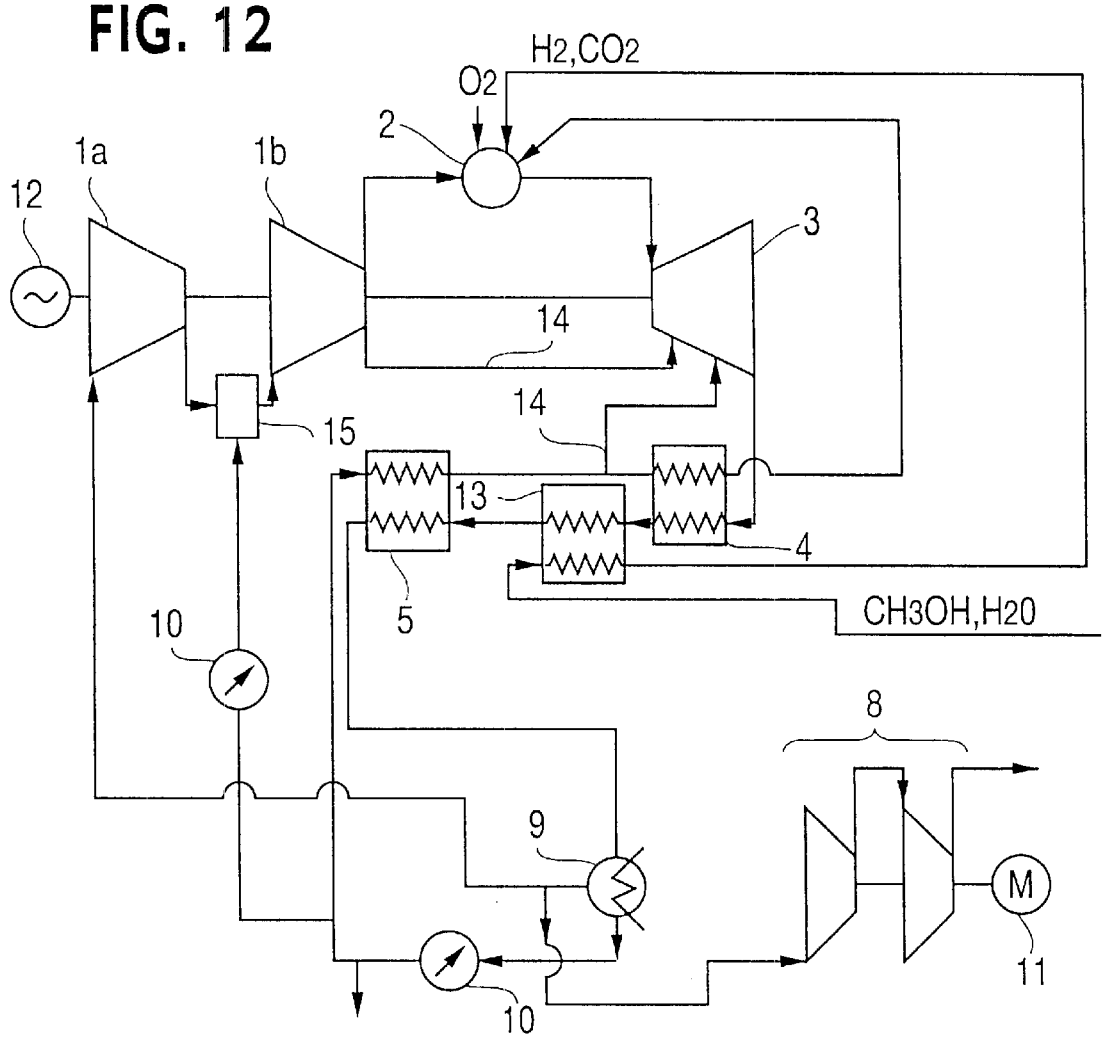
FIG. 12 is a diagrammatic view of a turbine plant of a twelfth embodiment according to the present invention.

FIG. 12 is a diagrammatic view of a turbine plant of a twelfth embodiment according to the present invention. In the present twelfth embodiment, the compressor 1 of the eleventh embodiment shown in FIG. 11 is divided into a low pressure compressor 1a and a high pressure compressor 1b, and an intercooler 15 is provided therebetween. In this intercooler 15, a low pressure compressor 1a outlet gas (a high pressure compressor 1b, inlet gas) is mixed with the pressurized water which has been pressurized approximately to a low pressure compressor 1a outlet pressure by the pressure pump 10 to be temperature-reduced so that a compression power of the high pressure compressor 1b is reduced and a high pressure compressor 1b outlet temperature is reduced. Thus, reliability of a disc strength of a high pressure compressor 1b outlet portion is enhanced, and because a combustor 2 inlet gas temperature is reduced, reliability of the high temperature portion of the combustor 2 can be enhanced. Construction of other portions is the same as that of the eleventh embodiment with description thereof being omitted.

According to the present twelfth embodiment, as mentioned above, the effects are to reduce the low pressure compressor 1a outlet gas temperature, to reduce the compression power of the high pressure compressor 1b and to enhance the gross thermal efficiency. Also, a reduction in the high pressure compressor 1b outlet temperature and enhancement of the reliability of the disc strength of the high pressure compressor 1b outlet portion can be obtained.

Further, an enhancement of the reliability of the high temperature portion of the combustor 2 can be obtained. Other effects of the twelfth embodiment are the same as that of the eleventh embodiment.

Figure 13:
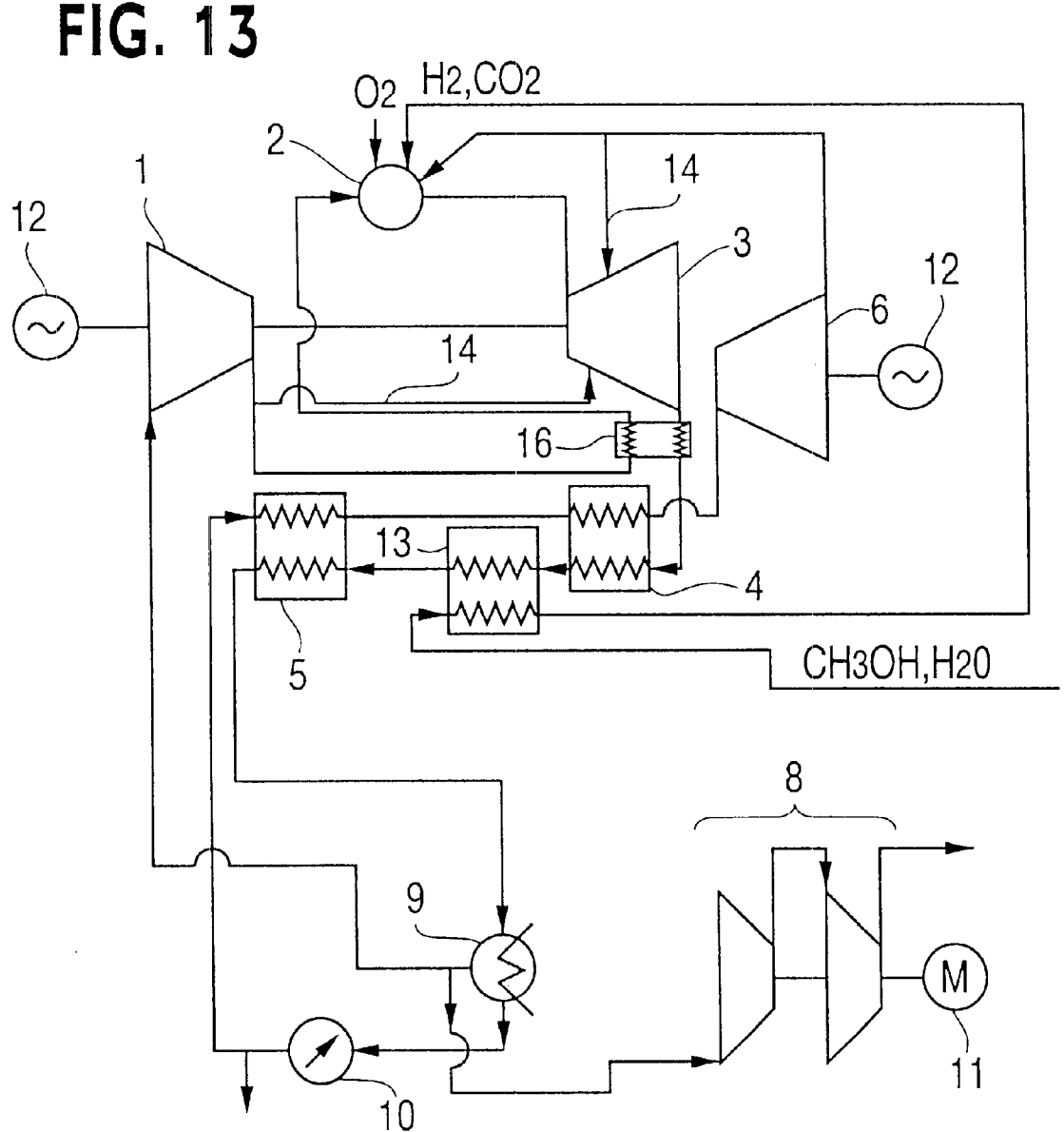
FIG. 13 is a diagrammatic view of a turbine plant of a thirteenth embodiment according to the present invention.

FIG. 13 is a diagrammatic view of a turbine plant of a thirteenth embodiment according to the present invention. In the present thirteenth embodiment, as compared with the third embodiment shown in FIG. 3, the outlet pressure of the high temperature turbine 3 is reduced and the outlet temperature of the high temperature turbine 3 is also reduced. Therefore, anti-creep life of a final stage moving blade of the high temperature turbine 3 is elongated. Also, the low pressure turbine 7 is eliminated so that construction cost thereof is reduced. Further, a supply system to the condenser 9 is modified so that supply therefor is provided from a heat exchanger 5 outlet. Thus, a supply line to the compressor 1 is modified so that supply therefor is provided from a condenser 9 outlet. Construction of other portions is the same as that of the third embodiment shown in FIG. 3.

According to the present thirteenth embodiment, as mentioned above, the elongation of the anti-creep life of the final stage moving blade of the high temperature turbine 3 can be obtained. Also, the low pressure turbine 7 is eliminated, so a reduction in the construction cost can be obtained. Further, a reduction in the compressor 1 inlet gas temperature, a reduction in the power of the compressor 1 and an enhancement in the gross thermal efficiency can be obtained. Other effects of the thirteenth embodiment are the same as that of the third embodiment.

Figure 14:
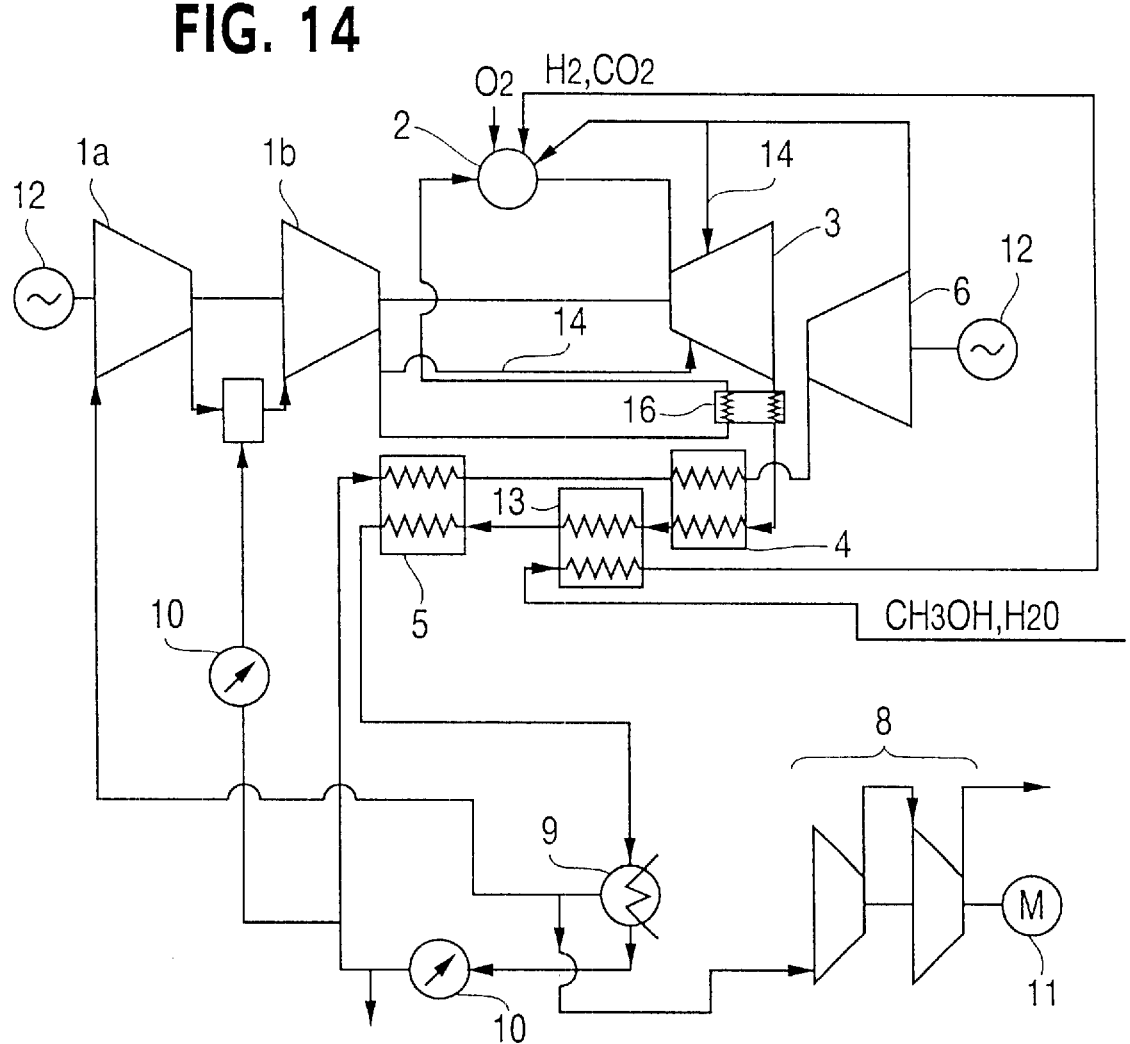
FIG. 14 is a diagrammatic view of a turbine plant of a fourteenth embodiment according to the present invention.

FIG. 14 is a diagrammatic view of a turbine plant of a fourteenth embodiment according to the present invention. In the present fourteenth embodiment, the compressor 1 of the thirteenth embodiment shown in FIG. 13 is divided into a low pressure compressor 1a and a high pressure compressor 1b, and an intercooler 15 is provided therebetween. In this intercooler 15, a low pressure compressor 1a outlet gas (a high pressure compressor 1b inlet gas) is mixed with the pressurized water which has been pressurized approximately to a low pressure compressor 1a outlet pressure by the pressure pump 10 to be temperature-reduced so that a compression power of the high pressure compressor 1b is reduced and a high pressure compressor 1b outlet temperature is reduced. Thus, reliability of a disc strength of a high pressure compressor 1b outlet portion is enhanced, and because a combustor 2 inlet gas temperature is reduced, reliability of the high temperature portion of the combustor 2 can be enhanced. Construction of other portions is the same as that of the thirteenth embodiment with description thereof being omitted.

According to the present fourteenth embodiment, as mentioned above, the effects are to reduce the low pressure compressor 1a outlet gas temperature, to reduce the compression power of the high pressure compressor 1b and to enhance the gross thermal efficiency. Also, a reduction in the high pressure compressor 1b outlet temperature and an enhancement of the reliability of the disc strength of the high pressure compressor 1b outlet portion can be obtained. Further, an enhancement of the reliability of the high temperature portion of the combustor 2 can be obtained. Other effects of the fourteenth embodiment are the same as that of the thirteenth embodiment.

Figure 15:
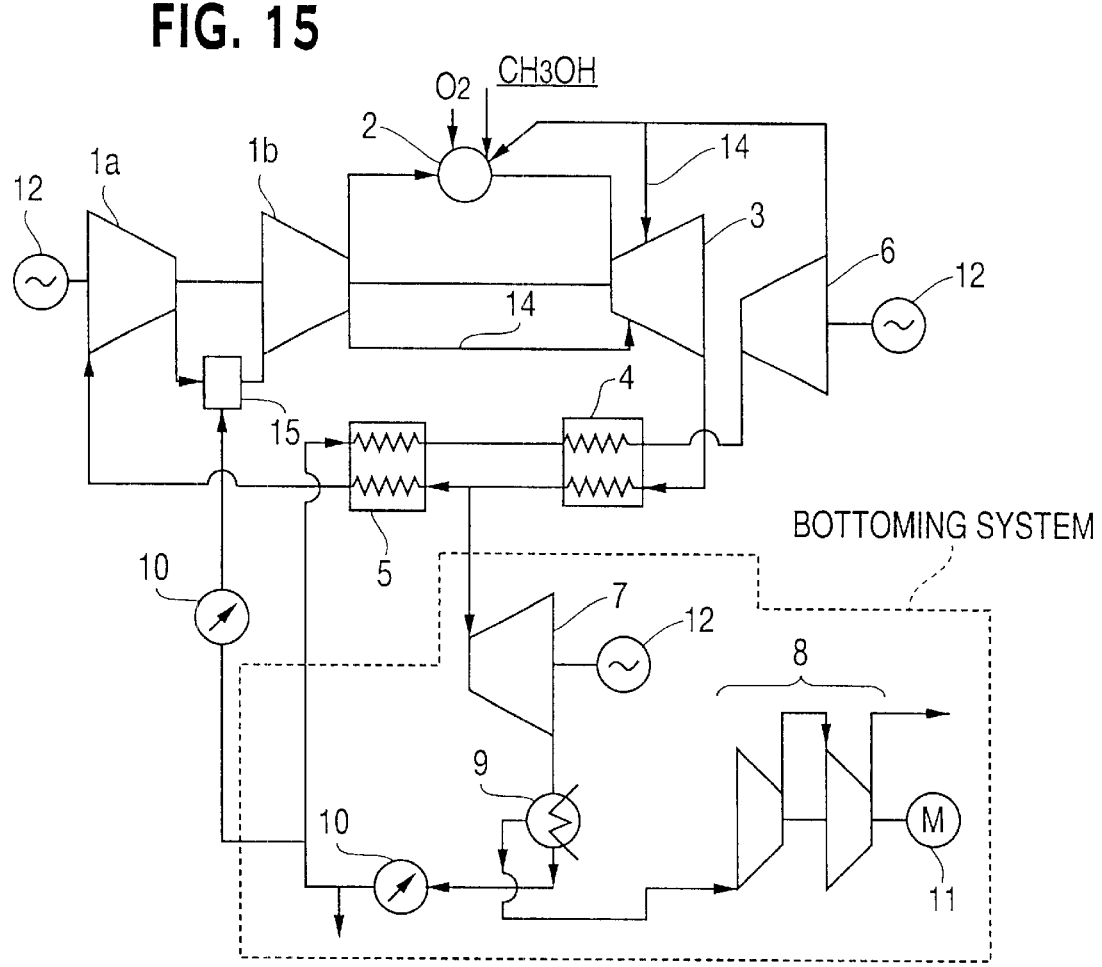
FIG. 15 is a diagrammatic view of a turbine plant of a fifteenth embodiment according to the present invention.
Figure 28:
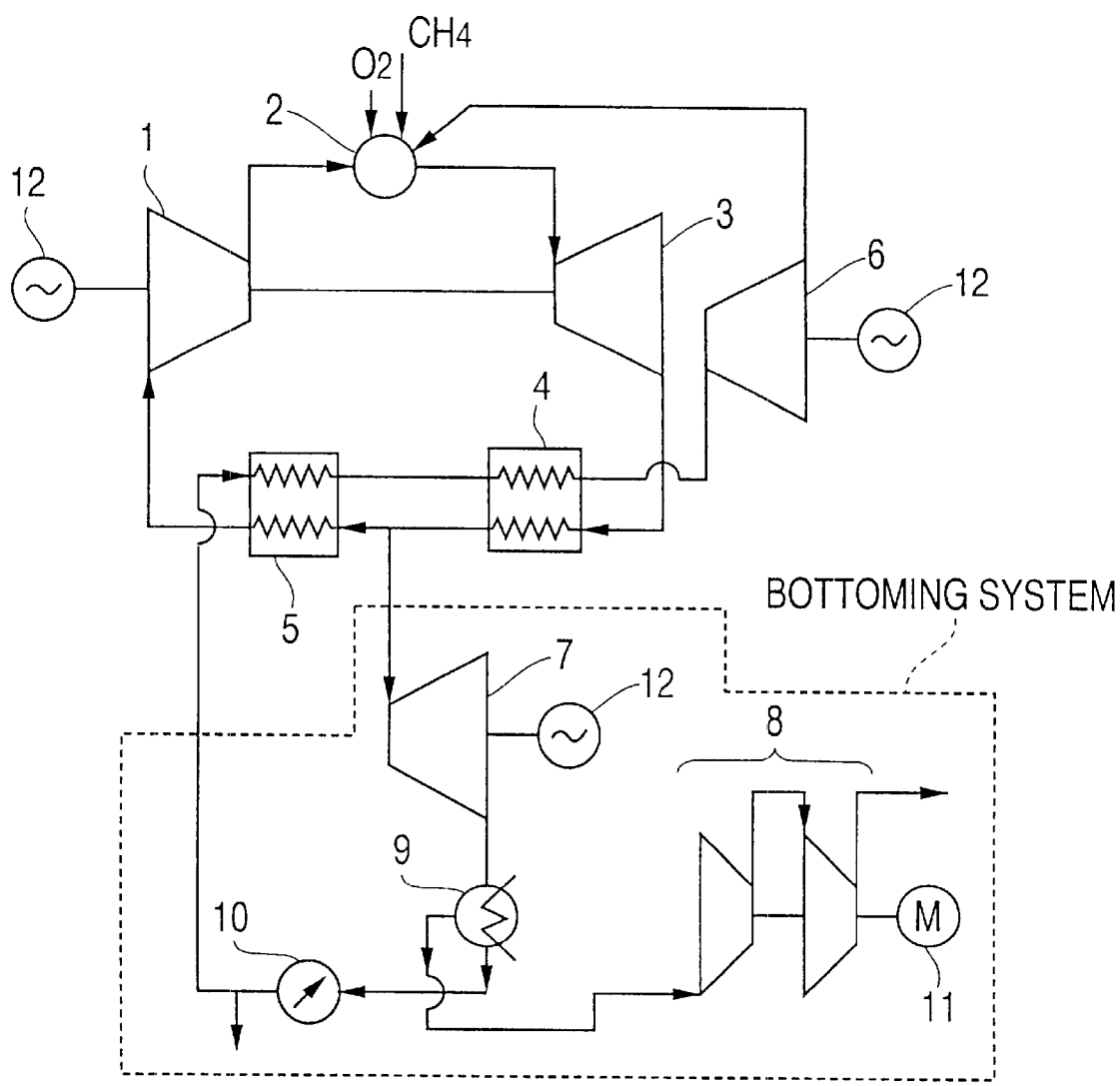
FIG. 28 is a diagrammatic view of a turbine plant in the prior art.

FIG. 15 is a diagrammatic view of a turbine plant of a fifteenth embodiment according to the present invention. In the present fifteenth embodiment, which uses methanol as fuel, an intercooler 15 is added to the prior art example shown in FIG. 28. That is, the compressor 1 of the prior art example shown in FIG. 28 is divided into a low pressure compressor 1a and a high pressure compressor 1b, and an intercooler 15 is provided therebetween. In this intercooler 15, a low pressure compressor 1a outlet gas (a high pressure compressor 1b inlet gas) is mixed with the pressurized water which has been pressurized approximately to a low pressure compressor 1a outlet pressure by the pressure pump 10 to be temperature-reduced so that a compression power of the high pressure compressor 1b is reduced and a gross thermal efficiency is enhanced. Also, a high pressure compressor 1b outlet temperature is reduced so that reliability of a disc strength of a high pressure compressor 1b outlet portion is enhanced, and because a combustor 2 inlet gas temperature is reduced, reliability of the high temperature portion of the combustor 2 can be enhanced.

Also, in the combustor 2, methanol ($CH_3OH$) reacts on the oxygen ($O_2$) which is needed for an equivalent combustion to generate a high temperature mixture gas of steam ($H_2O$) and carbon dioxide ($CO_2$) by the following reaction formula:

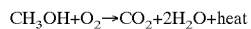

$$CH_3OH + O_2 \rightarrow CO_2 + 2H_2O + \text{heat}$$

Accordingly, the working fluid in this plant is carbon dioxide ($CO_2$) and steam ($H_2O$), like in the prior art case shown in FIG. 28.

Also, in order to cool the high temperature portion of the high temperature turbine 3, cooling medium 14 (mixture gas of steam and carbon dioxide) is extracted from an outlet of the high pressure turbine 6 and an outlet of the compressor 1.

It is to be noted that although methanol as fuel has been described here, it is also possible to use other fossil fuels. Further, it is also effective to use a fuel of a surplus gas generated at an iron making plant or the like, a coal gasified fuel, etc.

According to the present fifteenth embodiment, as mentioned above, the effects are to reduce the low pressure compressor 1a outlet gas temperature, to reduce the compression power of the high pressure compressor 1b and to enhance the gross thermal efficiency. Also, a reduction in the high pressure compressor 1b outlet temperature and an enhancement in the reliability of the disc strength of the high pressure compressor 1b outlet portion can be obtained.

Further, the combustor 2 inlet gas temperature is reduced, so enhancement of the reliability of the high temperature portion of the combustor 2 can be obtained. Also, the cooling medium 14 (mixture gas of steam and carbon dioxide) is extracted from the high pressure turbine 6 outlet and the compressor 1 outlet, so cooling of the high temperature portion of the high temperature turbine 3 and enhancement of the reliability of the high temperature turbine 3 can be obtained.

Figure 16:
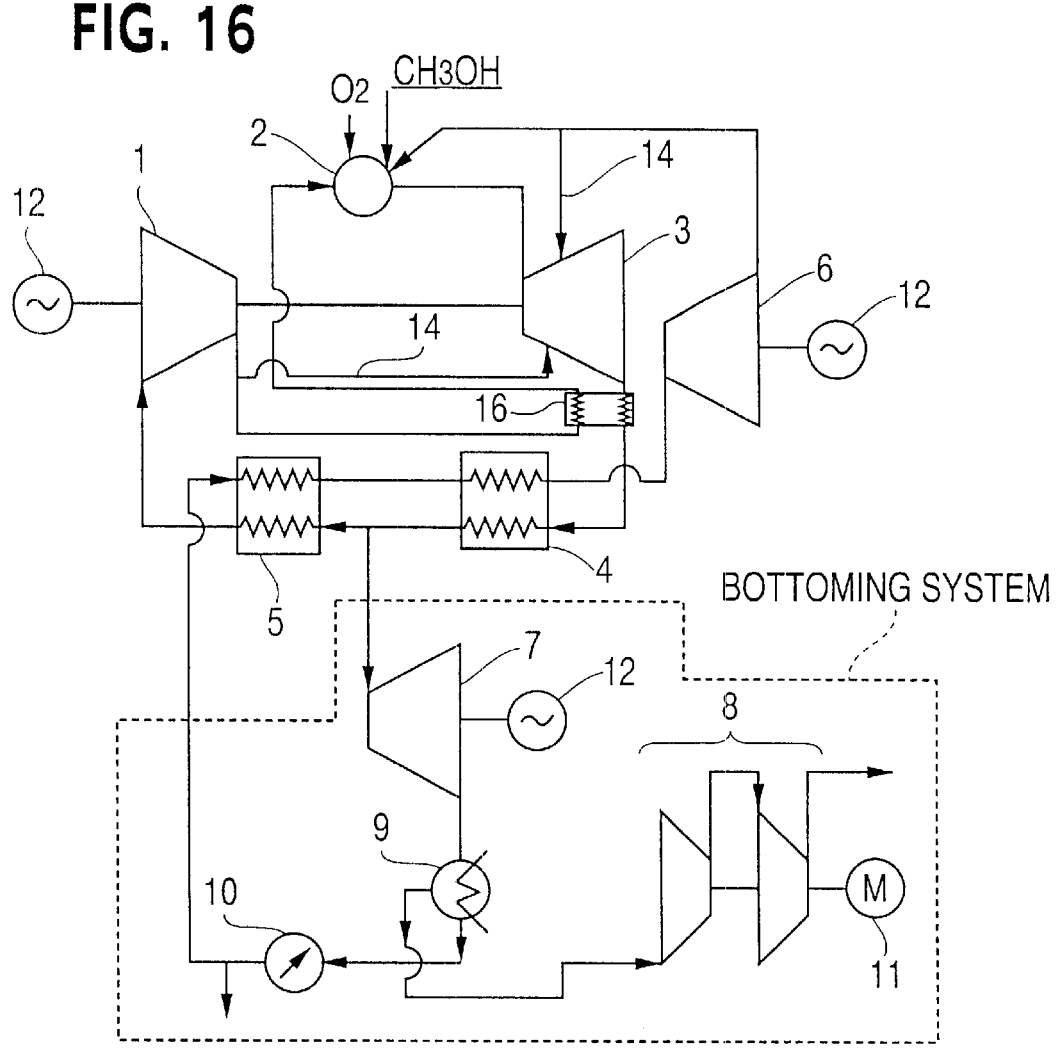
FIG. 16 is a diagrammatic view of a turbine plant of a sixteenth embodiment according to the present invention.

FIG. 16 is a diagrammatic view of a turbine plant of a sixteenth embodiment according to the present invention. In the present sixteenth embodiment, a regenerative heat exchanger 16 is provided on a downstream side of the high temperature turbine 3 so that a compressor 1 outlet gas is heat-exchanged with a high temperature turbine 3 exhaust gas. Thus, a combustor 2 inlet gas temperature is elevated, fuel flow rate is reduced and the gross thermal efficiency is enhanced.

Also, in order to cool the high temperature portion of the high temperature turbine 3, like in the fifteenth embodiment, cooling medium 14 (mixture gas of steam and carbon dioxide) is extracted from an outlet of the high pressure turbine 6 and an outlet of the compressor 1. Construction of other portions is the same as that of the prior art example shown in FIG. 28.

According to the present sixteenth embodiment, the combustor 2 inlet gas temperature is elevated and the fuel flow rate is reduced, so enhancement of the gross thermal efficiency can be obtained. Also, the cooling medium (mixture gas of steam and carbon dioxide) is extracted from the high pressure turbine 6 and the compressor 1 outlet, so cooling of the high temperature portion of the high temperature turbine 3 and enhancement of the reliability of the high temperature turbine 3 can be obtained.

Figure 17:
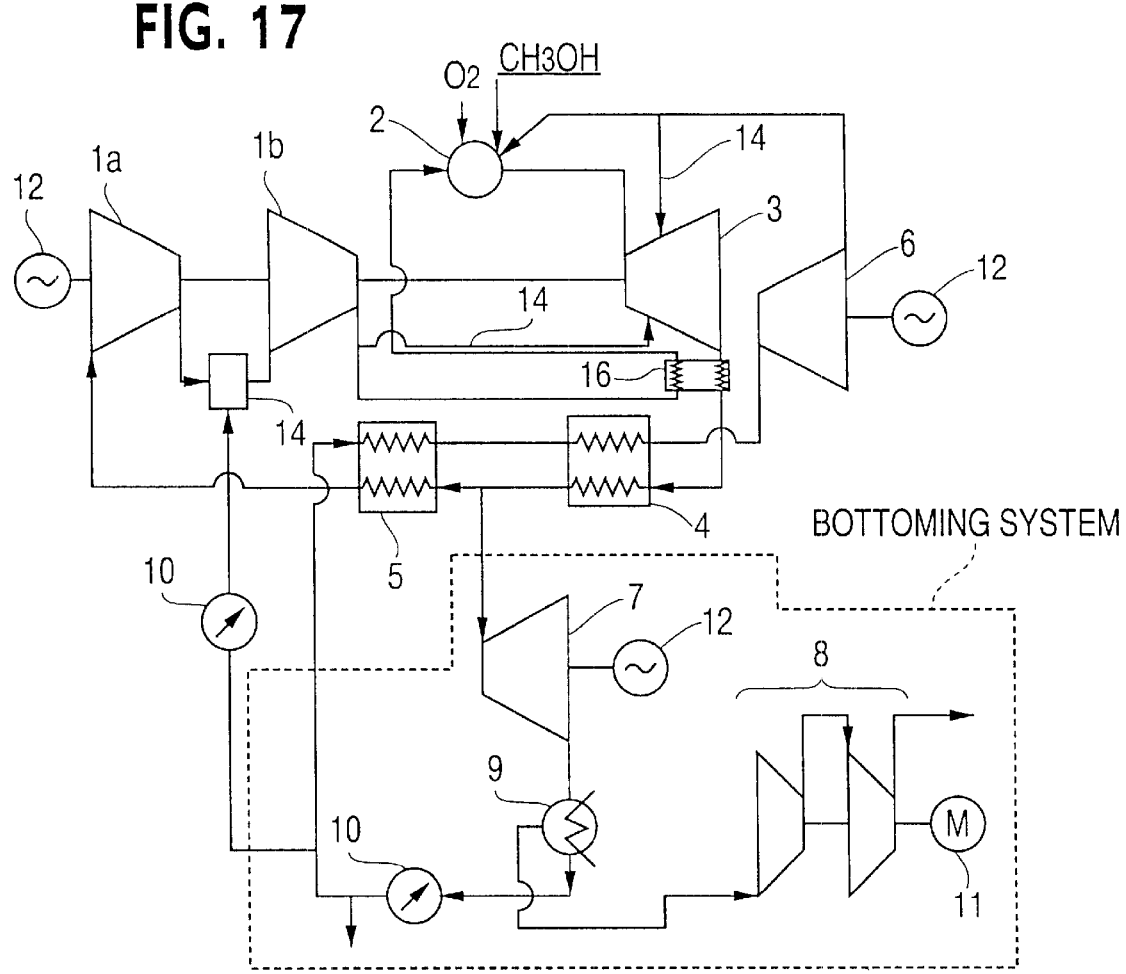
FIG. 17 is a diagrammatic view of a turbine plant of a seventeenth embodiment according to the present invention.

FIG. 17 is a diagrammatic view of a turbine plant of a seventeenth embodiment according to the present invention. In the present seventeenth embodiment, the compressor 1 of the sixteenth embodiment shown in FIG. 16 is divided into a low pressure compressor 1a and a high pressure compressor 1b, and an intercooler 15 is provided therebetween. In this intercooler 15, a low pressure compressor 1a outlet gas (a high pressure compressor 1b inlet gas) is mixed with the pressurized water which has been pressurized approximately to a low pressure compressor 1a outlet pressure by the pressure pump 10 to be temperature-reduced so that a compression power of the high pressure compressor 1b is reduced and a high pressure compressor 1b outlet temperature is reduced. Thus, reliability of a disc strength of a high pressure compressor 1b outlet portion is enhanced, and because a combustor 2 inlet gas temperature is reduced, reliability of the high temperature portion of the combustor 2 can be enhanced. Construction of other portions is the same as that of the sixteenth embodiment with description thereof being omitted.

According to the present sixth embodiment, as mentioned above, the effects are to reduce the low pressure compressor 1a outlet gas temperature, to reduce the compression power of the high pressure compressor 1b and to enhance the gross thermal efficiency. Also, a reduction in the high pressure compressor 1b outlet temperature and an enhancement in the reliability of the disc strength of the high pressure compressor 1b outlet portion can be obtained. Further, enhancement of the reliability of the high temperature portion of the combustor 2 can be obtained. Other effects of the seventeenth embodiment are the same as that of the sixteenth embodiment.

Figure 18:
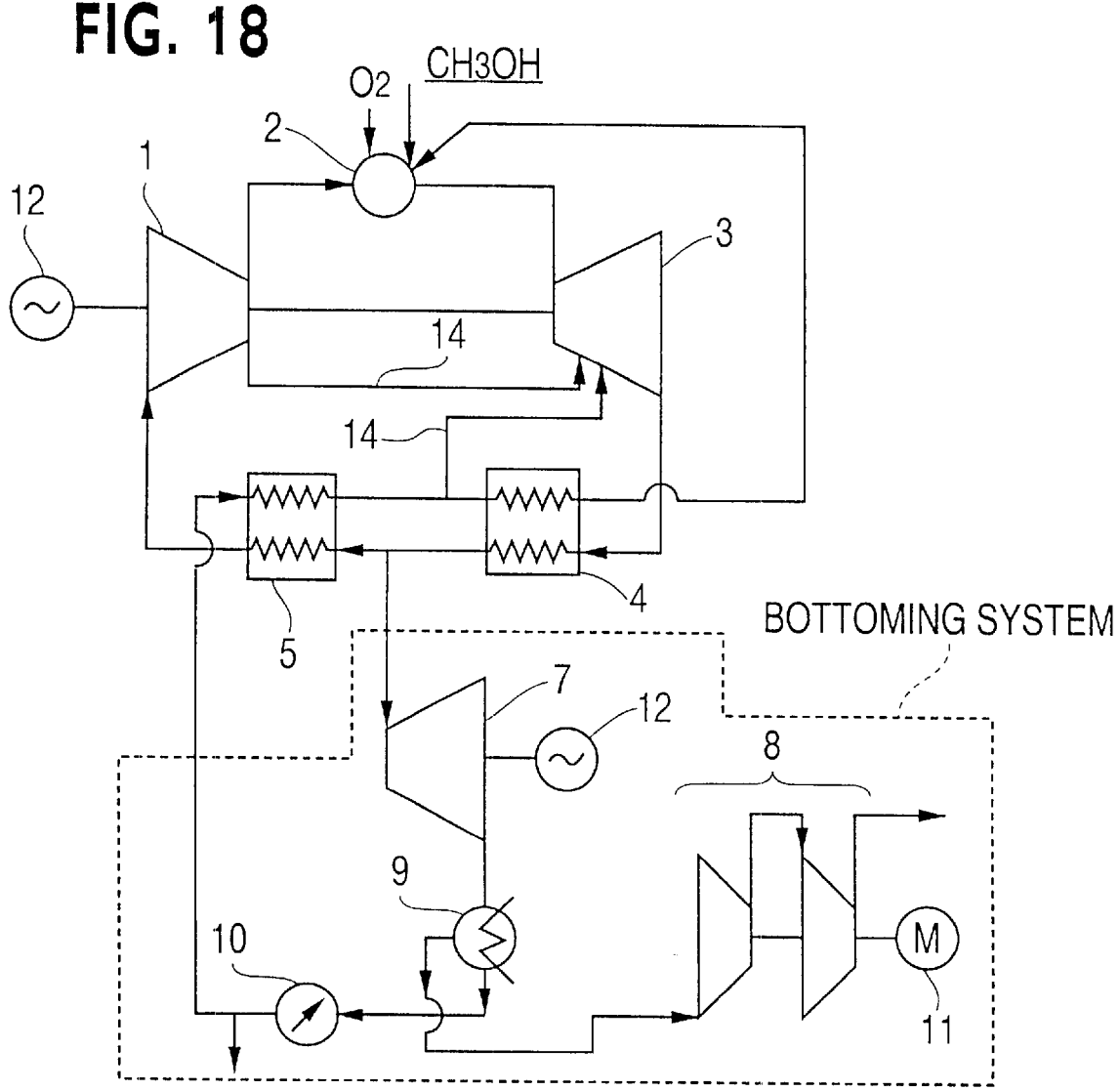
FIG. 18 is a diagrammatic view of a turbine plant of an eighteenth embodiment according to the present invention.

FIG. 18 is a diagrammatic view of a turbine plant of an eighteenth embodiment according to the present invention. In the present eighteenth embodiment, as compared with the prior art example shown in FIG. 28, the high pressure turbine 6 is eliminated, so that construction cost thereof can be reduced. Also, in order to cool the high temperature portion of the high temperature turbine 3, the cooling medium is extracted from the compressor 1 outlet and from the high temperature gas side between heat exchangers 4, 5 so that reliability of the high temperature turbine 3 is enhanced. Construction of other portions is the same as that of the prior art example shown in FIG. 28.

According to the present eighteenth embodiment, as mentioned above, the reduction in the construction cost can be obtained. Also, because the cooling medium is extracted from the compressor 1 outlet and from the high temperature side gas between the heat exchangers 4, 5 to be used for cooling of the high temperature portion of the high temperature turbine 3, enhancement the reliability of the high temperature turbine 3 can be obtained.

Figure 19:
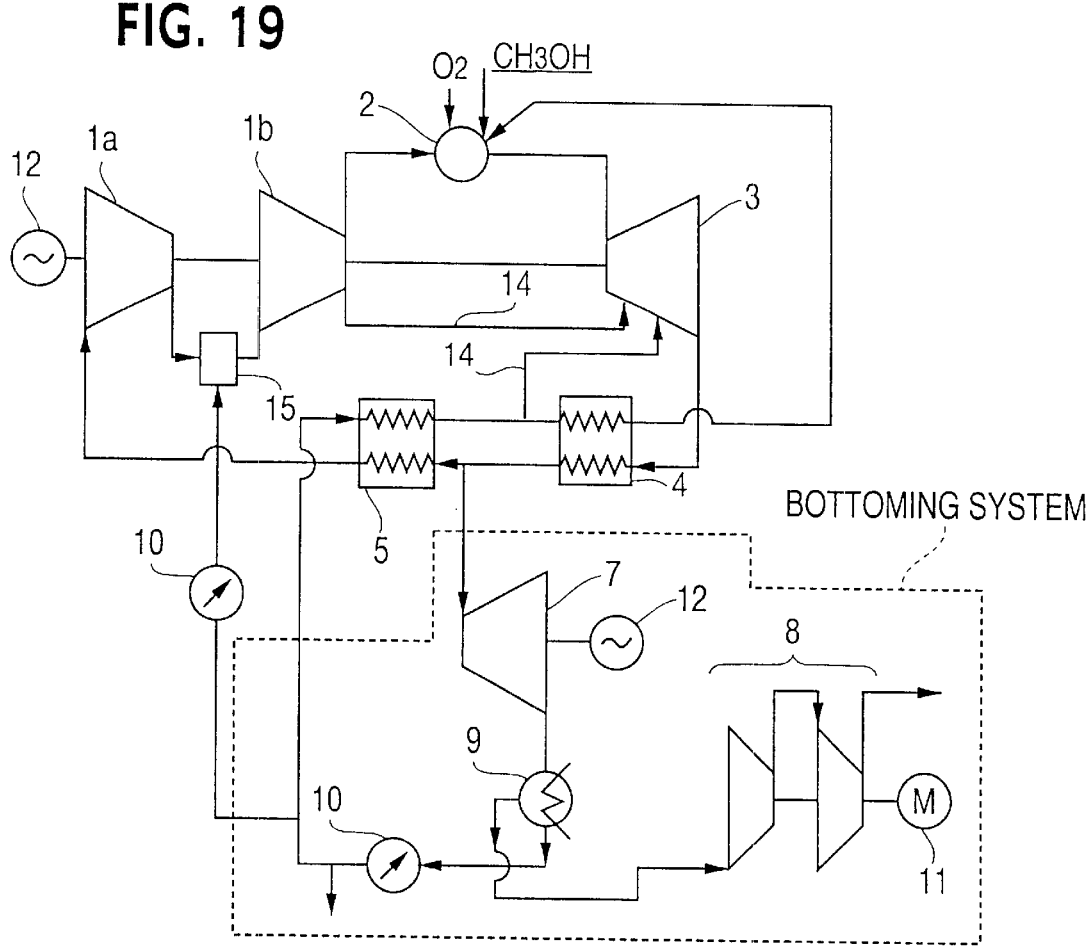
FIG. 19 is a diagrammatic view of a turbine plant of a nineteenth embodiment according to the present invention.

FIG. 19 is a diagrammatic view of a turbine plant of a nineteenth embodiment according to the present invention. In the present nineteenth embodiment, the compressor 1 of the eighteenth embodiment shown in FIG. 18 is divided into a low pressure compressor 1a and a high pressure compressor 1b, and an intercooler 15 is provided therebetween. In this intercooler 15, a low pressure compressor 1a outlet gas (a high pressure compressor 1b inlet gas) is mixed with the pressurized water which has been pressurized approximately to a low pressure compressor 1a outlet pressure by the pressure pump 10 to be temperature-reduced so that a compression power of the high pressure compressor 1b is reduced and a high pressure compressor 1b outlet temperature is reduced. Thus, reliability of a disc strength of a high pressure compressor 1b outlet portion is enhanced, and because a combustor 2 inlet gas temperature is being reduced, reliability of the high temperature portion of the combustor 2 can be enhanced. Construction of other portions is the same as that of the eighteenth embodiment with description thereof being omitted.

According to the present nineteenth embodiment, as mentioned above, the effects are to reduce the low pressure compressor 1a outlet gas temperature, to reduce the compression power of the high pressure compressor 1b and to enhance the gross thermal efficiency. Also, reduction in the high pressure compressor 1b outlet temperature and enhancement of the reliability of the disc strength of the high pressure compressor 1b outlet portion can be obtained. Further, enhancement of the reliability of the high temperature portion of the combustor 2 can be obtained. Other effects of the nineteenth embodiment are the same as that of the eighteenth embodiment.

Figure 20:
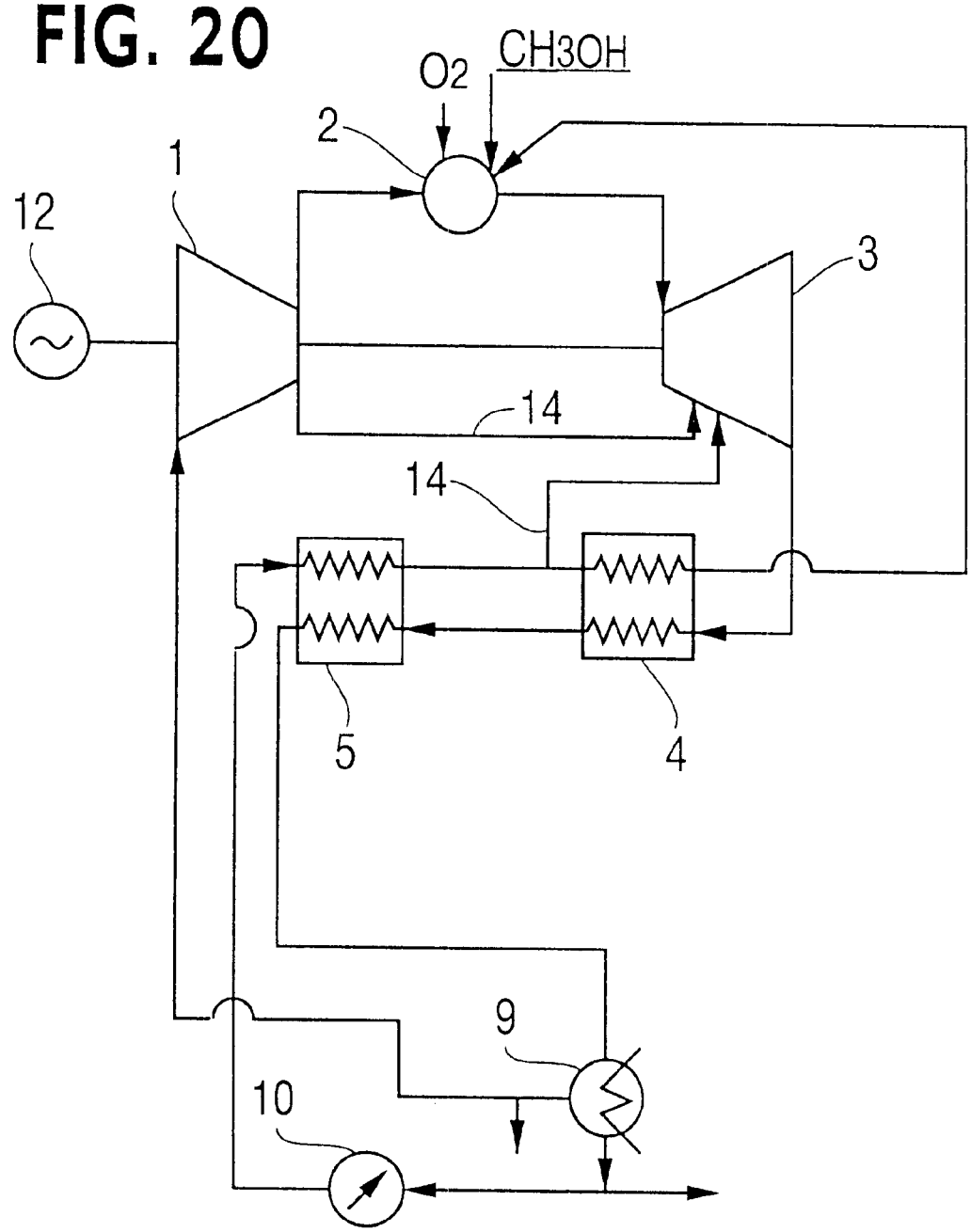
FIG. 20 is a diagrammatic view of a turbine plant of a twentieth embodiment according to the present invention.

FIG. 20 is a diagrammatic view of a turbine plant of a twentieth embodiment according to the present invention. In the present twentieth embodiment, as compared with the prior art example shown in FIG. 28, the high pressure turbine 6, and the low pressure turbine 7 and $CO_2$ compressor 8 with motor 11 of the bottoming system are eliminated so that construction cost thereof is reduced. Thereby, the high temperature turbine cooling gas which has been extracted from the high pressure turbine 6 outlet in the prior art example of FIG. 28 is extracted from a high temperature side gas of the heat exchangers 4, 5, as there is no high pressure turbine 6. Also, a supply system to the condenser 9 is modified so that supply therefor is provided from a heat exchanger 5 outlet. Thus, a supply line to the compressor 1 is modified so that supply therefor is provided from a condenser 9 outlet. Construction of other portions is the same as that of the prior art example shown in FIG. 28.

According to the present twentieth embodiment, the high pressure turbine and the bottoming system are eliminated so that reduction in the construction cost can be obtained. Also, a reduction in the compressor 1 inlet temperature, a reduction in the power of the compressor 1 and enhancement of the gross thermal efficiency can be obtained.

Figure 21:
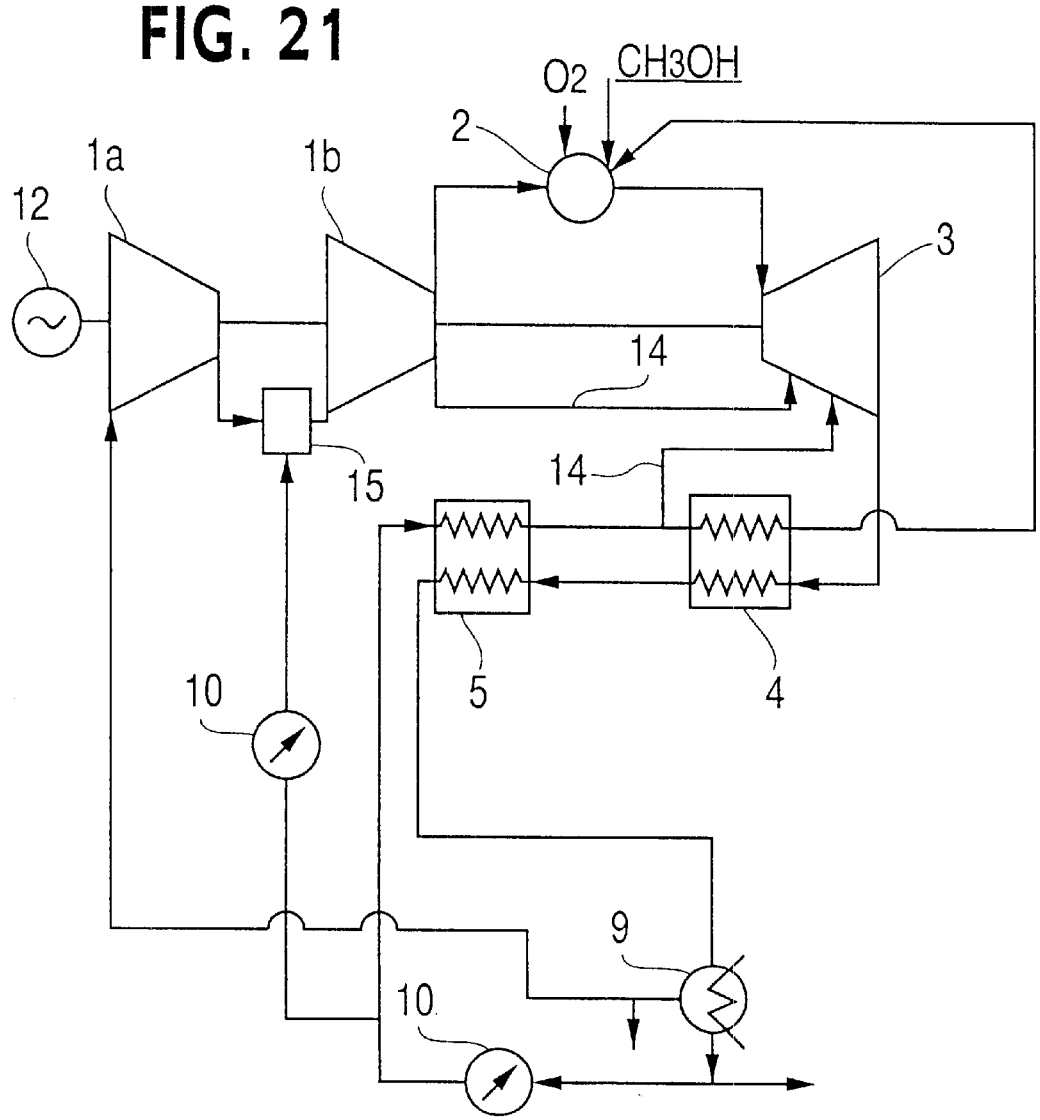
FIG. 21 is a diagrammatic view of a turbine plant of a twenty-first embodiment according to the present invention.

FIG. 21 is a diagrammatic view of a turbine plant of a twenty-first embodiment according to the present invention. In the present twenty-first embodiment, the compressor 1 of the twentieth embodiment shown in FIG. 20 is divided into a low pressure compressor 1a and a high pressure compressor 1b, and an intercooler 15 is provided therebetween. In this intercooler 15, a low pressure compressor 1a outlet gas (a high pressure compressor 1b inlet gas) is mixed with the pressurized water which has been pressurized approximately to a low pressure compressor 1a outlet pressure by the pressure pump 10 to be temperature-reduced so that a compression power of the high pressure compressor 1b is reduced and a high pressure compressor 1b outlet temperature is reduced. Thus, reliability of a disc strength of a high pressure compressor 1b outlet portion is enhanced, and because a combustor 2 inlet gas temperature is reduced, reliability of the high temperature portion of the combustor 2 can be enhanced. Construction of other portions is the same as that of the twentieth embodiment with description thereof being omitted.

According to the present twenty-first embodiment, as mentioned above, the effects are to reduce the low pressure compressor 1a outlet gas temperature, to reduce the compression power of the high pressure compressor 1b and to enhance the gross thermal efficiency. Also, a reduction in the high pressure compressor 1b outlet temperature and enhancement of the reliability of the disc strength of the high pressure compressor 1b outlet portion can be obtained. Further, enhancement of the reliability of the high temperature portion of the combustor 2 can be obtained. Other effects of the twenty-first embodiment are the same as that of the twentieth embodiment.

Figure 22:
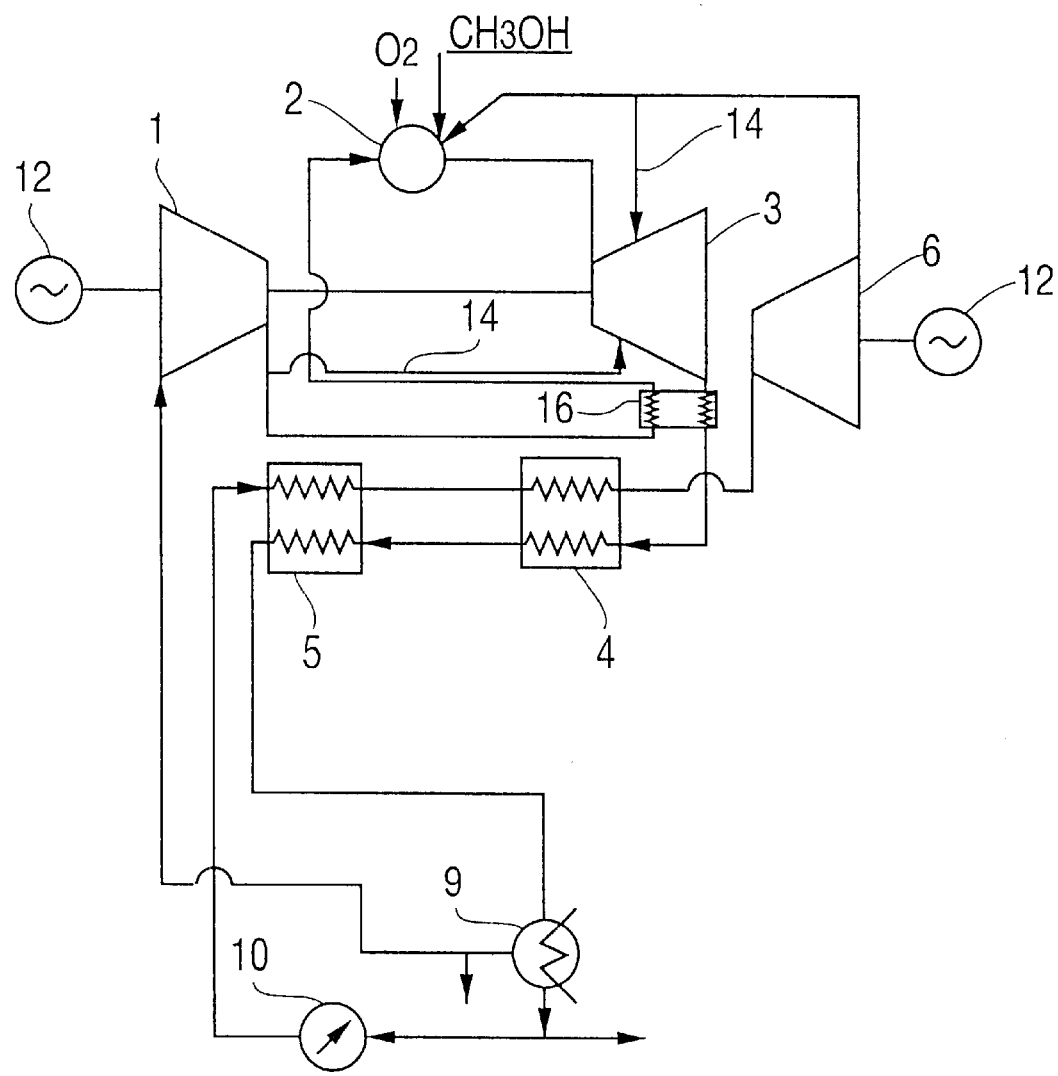
FIG. 22 is a diagrammatic view of a turbine plant of a twenty-second embodiment according to the present invention.

FIG. 22 is a diagrammatic view of a turbine plant of a twenty-second embodiment according to the present invention. In the present twenty-second embodiment, as compared with the sixteenth embodiment shown in FIG. 16, the low pressure turbine 7 and $CO_2$ compressor 8 with motor 11 of the bottoming system are eliminated so that construction cost thereof is reduced. Also, a supply system to the condenser 9 is modified so that supply therefor is provided from a heat exchanger 5 outlet. Thus, a supply line to the compressor 1 is modified so that supply therefor is provided from a condenser 9 outlet.

According to the present twenty-second embodiment, the bottoming system is eliminated so that a reduction in the construction cost can be obtained. Also, a reduction in the compressor 1 inlet temperature, reduction in the power of the compressor 1 and enhancement of the gross thermal efficiency can be obtained. Other effects of the twenty-second embodiment are the same as that of the sixteenth embodiment shown in FIG. 16.

Figure 23:
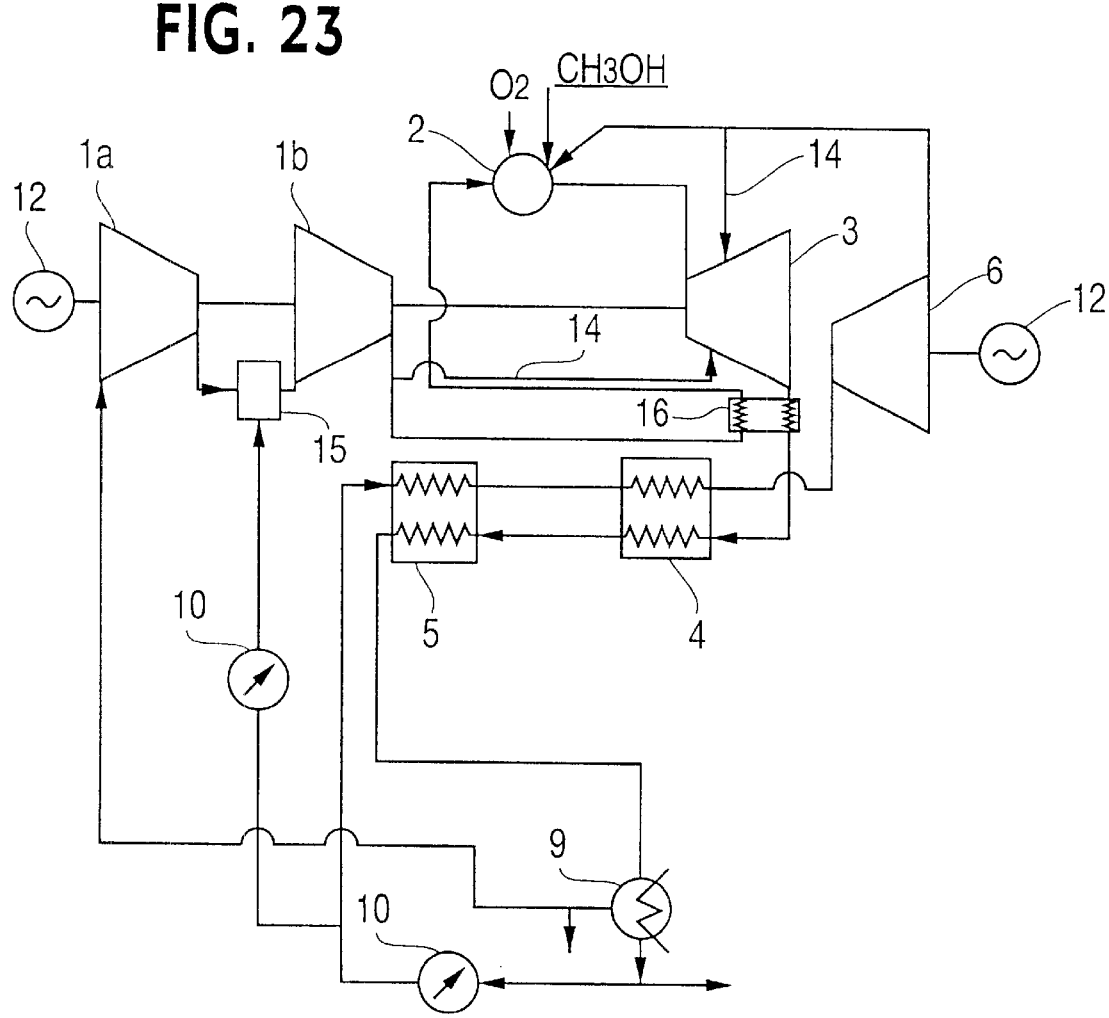
FIG. 23 is a diagrammatic view of a turbine plant of a twenty-third embodiment according to the present invention.

FIG. 23 is a diagrammatic view of a turbine plant of a twenty-third embodiment according to the present invention. In the present twenty-third embodiment, the compressor 1 of the twenty-second embodiment shown in FIG. 22 is divided into a low pressure compressor 1a and a high pressure compressor 1b, and an intercooler 15 is provided therebetween. In this intercooler 15, a low pressure compressor 1a outlet gas (a high pressure compressor 1b inlet gas) is mixed with the pressurized water which has been pressurized approximately to a low pressure compressor 1a outlet pressure by the pressure pump 10 to be temperature-reduced so that a compression power of the high pressure compressor 1b is reduced and a high pressure compressor 1b outlet temperature is reduced. Thus, reliability of a disc strength of a high pressure compressor 1b outlet portion is enhanced, and because a combustor 2 inlet gas temperature is reduced, reliability of the high temperature portion of the combustor 2 can be enhanced. Construction of other portions is the same as that of the twenty-second embodiment with description thereof being omitted.

According to the present twenty-third embodiment, as mentioned above, the effects are to reduce the low pressure compressor 1a outlet gas temperature, to reduce the compression power of the high pressure compressor 1b and to enhance the gross thermal efficiency. Also, the reduction in the high pressure compressor 1b outlet temperature and enhancement of the reliability of the disc strength of the high pressure compressor 1b outlet portion can be obtained. Further, enhancement of the reliability of the high temperature portion of the combustor 2 can be obtained. Other effects of the twenty-third embodiment are the same as that of the twenty-second embodiment.

Figure 24:
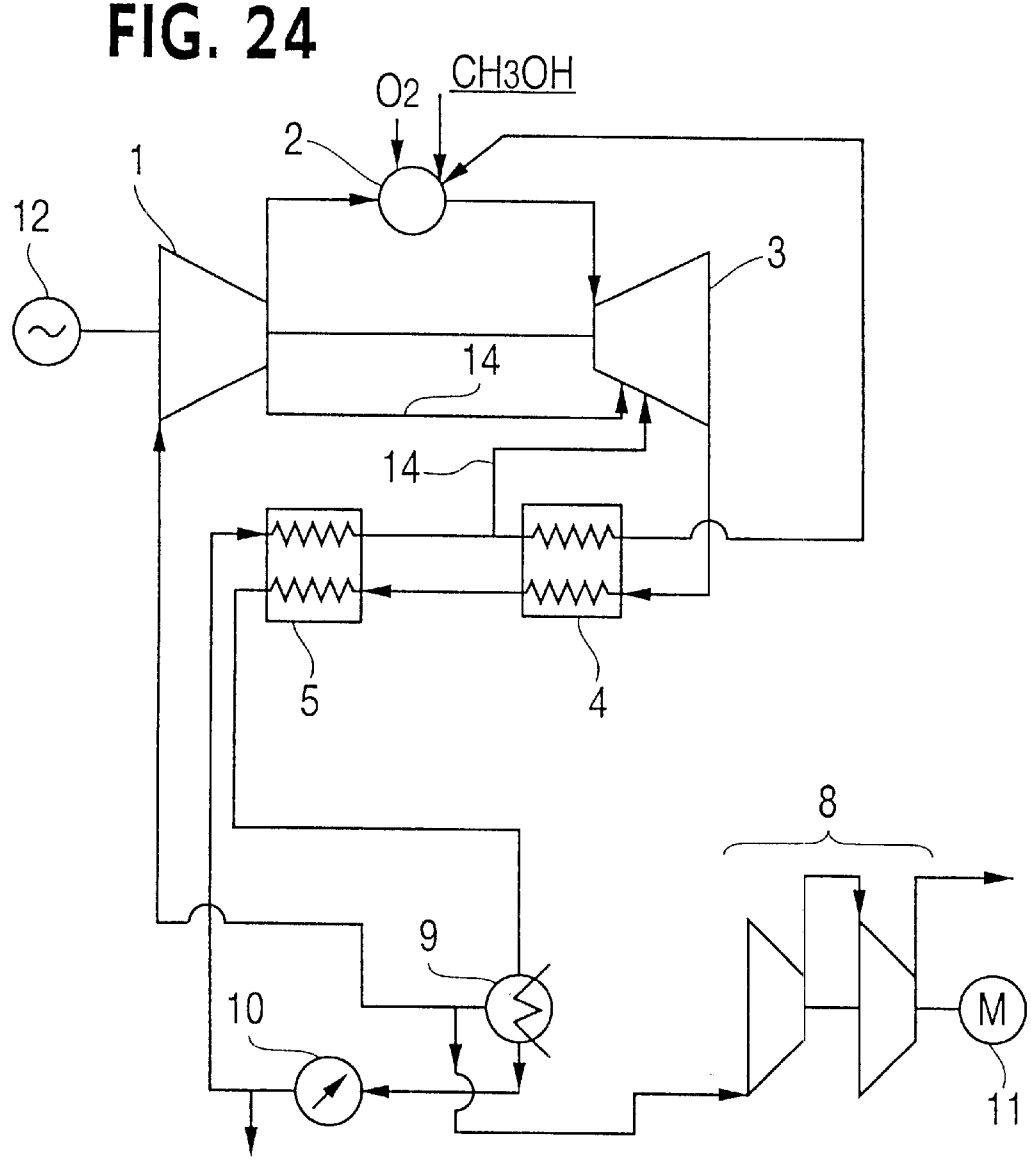
FIG. 24 is a diagrammatic view of a turbine plant of a twenty-fourth embodiment according to the present invention.

FIG. 24 is a diagrammatic view of a turbine plant of a twenty-fourth embodiment according to the present invention. In the present twenty-fourth embodiment, as compared with the prior art example shown in FIG. 28, the outlet pressure of the high temperature turbine 3 is reduced and the outlet temperature of the high temperature turbine 3 is also reduced so that anti-creep life of a final stage moving blade of the high temperature turbine 3 is elongated. Also, the high pressure turbine 6 and the low pressure turbine 7 are eliminated so that construction cost thereof is reduced. Also, in order to cool the high temperature portion of the high temperature turbine 3, cooling medium is extracted from an outlet of the compressor 1 and from a high temperature gas side between heat exchangers 4, 5 so that reliability of the high temperature turbine 3 is enhanced. Further, a supply system to the condenser 9 is modified so that supply therefor is provided from a heat exchanger 5 outlet. Thus, a supply line to the compressor 1 is modified so that supply therefor is provided from a condenser 9 outlet. Construction of other portions is the same as that of the prior art example shown in FIG. 28.

According to the present twenty-fourth embodiment, as mentioned above, elongation of the anti-creep life of the final stage moving blade of the high temperature turbine 3 can be obtained. Also, a reduction in the construction cost can be obtained. Further, the high temperature portion of the high temperature turbine 3 is cooled, so that enhancement of the reliability of the high temperature turbine 3 can be obtained. Still further, a reduction in the compressor 1 inlet gas temperature, a reduction in the power of the compressor 1 and to enhancement of the gross thermal efficiency can be obtained.

Figure 25:
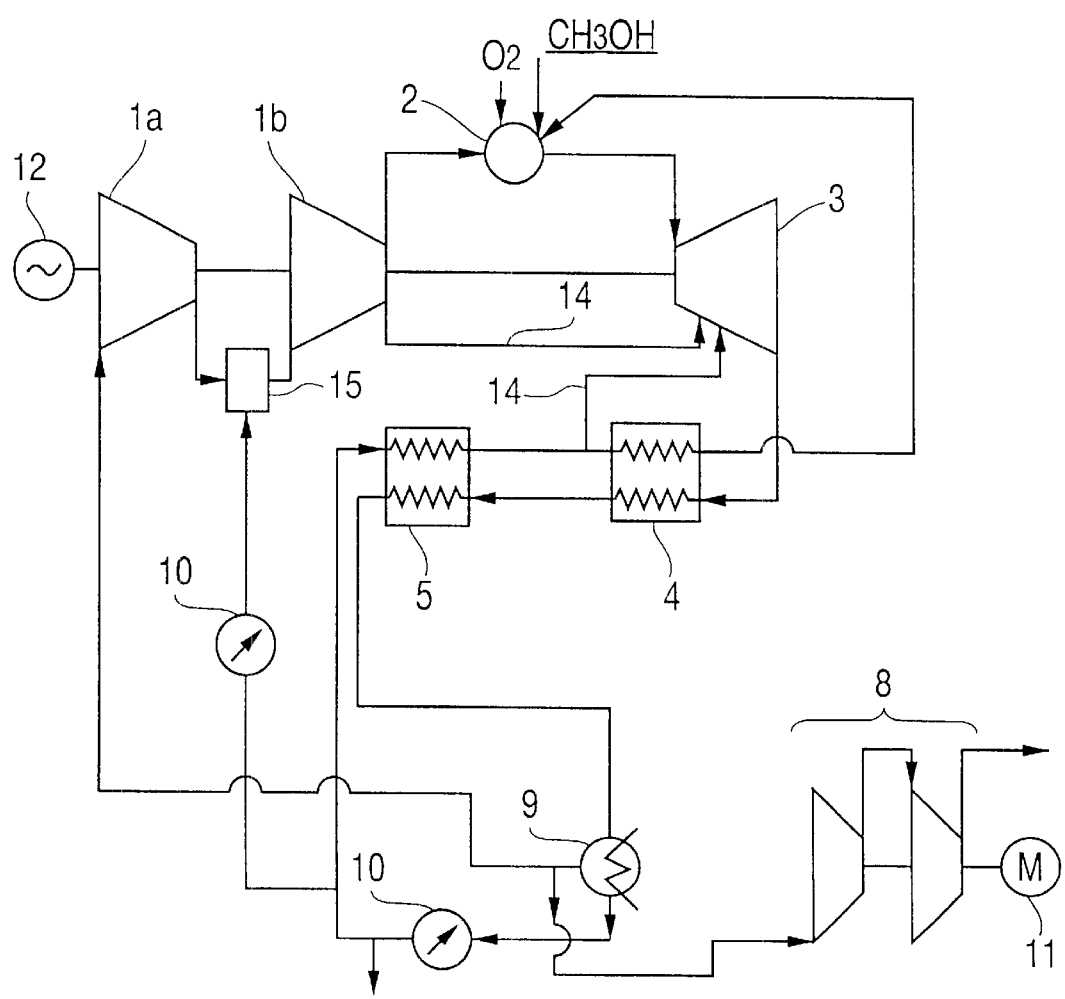
FIG. 25 is a diagrammatic view of a turbine plant of a twenty-fifth embodiment according to the present invention.

FIG. 25 is a diagrammatic view of a turbine plant of a twenty-fifth embodiment according to the present invention. In the present twenty-fifth embodiment, the compressor 1 of the twenty-fourth embodiment shown in FIG. 24 is divided into a low pressure compressor 1a and a high pressure compressor 1b, and an intercooler 15 is provided therebetween. In this intercooler 15, a low pressure compressor 1a outlet gas (a high pressure compressor 1b inlet gas) is mixed with the pressurized water which has been pressurized approximately to a low pressure compressor 1a outlet pressure by the pressure pump 10 to be temperature-reduced so that a compression power of the high pressure compressor 1b is reduced and a high pressure compressor 1b outlet temperature is reduced. Thus, reliability of a disc strength of a high pressure compressor 1b outlet portion is enhanced, and because a combustor 2 inlet gas temperature is reduced, reliability of the high temperature portion of the combustor 2 can be enhanced. Construction of other portions is the same as that of the fifth embodiment with description thereof being omitted.

According to the present twenty-fifth embodiment, as mentioned above, the effects are to reduce the low pressure compressor 1a outlet gas temperature, to reduce the compression power of the high pressure compressor 1b and to enhance the gross thermal efficiency. Also, a reduction in the high pressure compressor 1b outlet temperature and enhancement of the reliability of the disc strength of the high pressure compressor 1b outlet portion can be obtained. Further, enhancement of the reliability of the high temperature portion of the combustor 2 can be obtained. Other effects of the twenty-fifth embodiment are the same as that of the twenty-fourth embodiment.

Figure 26:
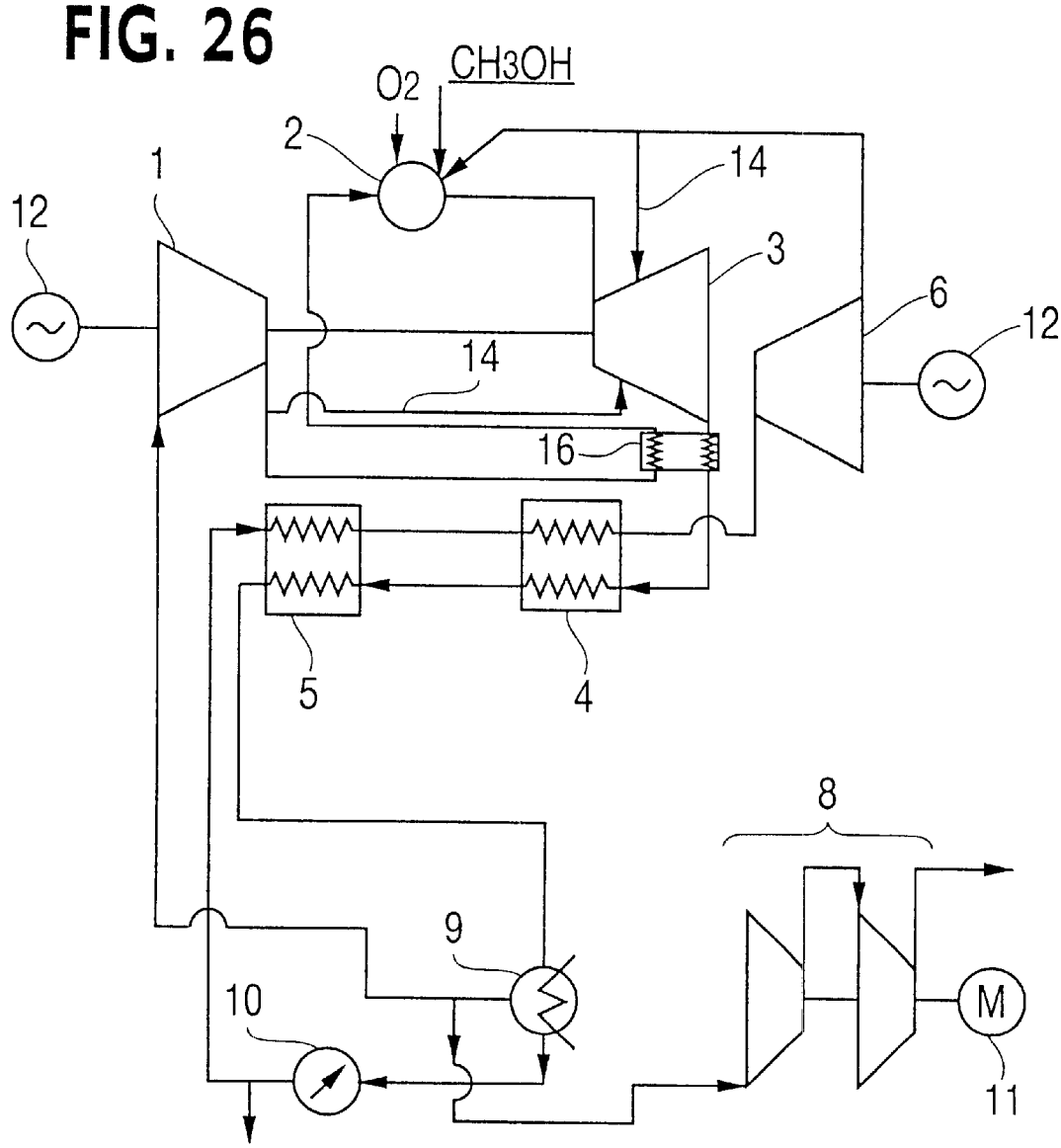
FIG. 26 is a diagrammatic view of a turbine plant of a twenty-sixth embodiment according to the present invention.

FIG. 26 is a diagrammatic view of a turbine plant of a twenty-sixth embodiment according to the present invention. In the present twenty-sixth embodiment, as compared with the sixteenth embodiment shown in FIG. 16, the outlet pressure of the high temperature turbine 3 is reduced and the outlet temperature of the high temperature turbine 3 is also reduced. Thus, anti-creep life of a final stage moving blade of the high temperature turbine 3 is elongated. Also, the low pressure turbine 7 is eliminated so that construction cost thereof is reduced. Further, a supply system to the condenser 9 is modified so that supply therefor is provided from a heat exchanger 5 outlet. Thus, a supply line to the compressor 1 is modified so that supply therefor is provided from a condenser 9 outlet. Construction of other portions is the same as that of the sixteenth embodiment shown in FIG. 16.

According to the present twenty-sixth embodiment, as mentioned above, an elongation of the anti-creep life of the final stage moving blade of the high temperature turbine 3 can be obtained. Also, the low pressure turbine 7 is eliminated, so a reduction in the construction cost can be obtained. Further, reduction in the compressor 1 inlet gas temperature, a reduction in the power of the compressor 1 and enhancement of the gross thermal efficiency can be obtained.

Figure 27:
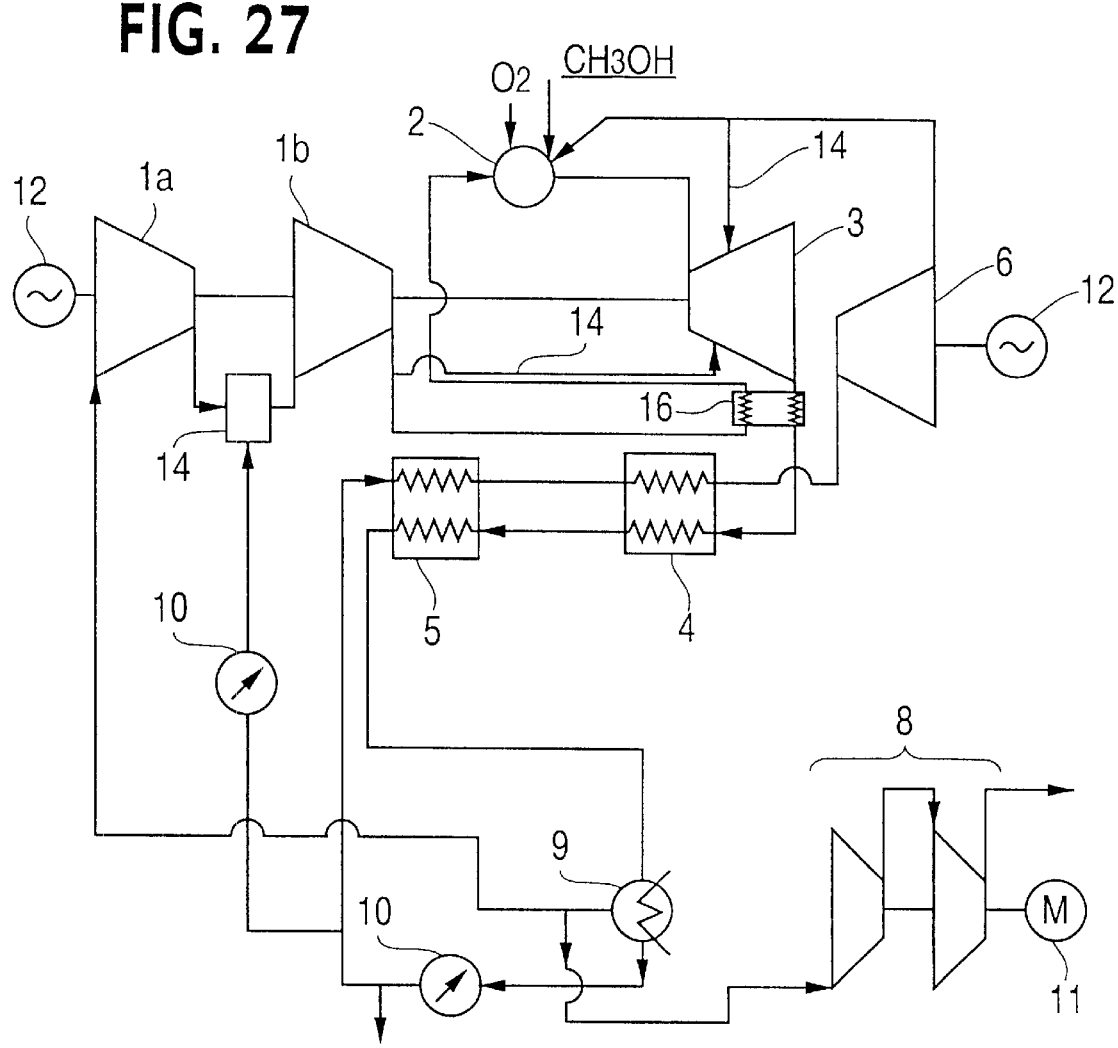
FIG. 27 is a diagrammatic view of a turbine plant of a twenty-seventh embodiment according to the present invention.

FIG. 27 is a diagrammatic view of a turbine plant of a twenty-seventh embodiment according to the present invention. In the present twenty-seventh embodiment, the compressor 1 of the twenty-sixth embodiment shown in FIG. 26 is divided into a low pressure compressor 1a and a high pressure compressor 1b, and an intercooler 15 is provided therebetween. In this intercooler 15, a low pressure compressor 1a outlet gas (a high pressure compressor 1b inlet gas) is mixed with the pressurized water which has been pressurized approximately to a low pressure compressor 1a outlet pressure by the pressure pump 10 to be temperature-reduced so that a compression power of the high pressure compressor 1b is reduced and a high pressure compressor 1b outlet temperature is reduced. Thus, reliability of a disc strength of a high pressure compressor 1b outlet portion is enhanced, and because a combustor 2 inlet gas temperature is reduced, reliability of the high temperature portion of the combustor 2 can be enhanced. Construction of other portions is the same as that of the twenty-sixth embodiment with description thereof being omitted.

According to the present twenty-seventh embodiment, as mentioned above, the effects are to reduce the low pressure compressor 1a outlet gas temperature, to reduce the compression power of the high pressure compressor 1b and to enhance the gross thermal efficiency. Also, a reduction in the high pressure compressor 1b outlet temperature and enhancement of the reliability of the disc strength of the high pressure compressor 1b outlet portion can be obtained. Further, enhancement of the reliability of the high temperature portion of the combustor 2 can be obtained. Other effects of the twenty-seventh embodiment are the same as that of the twenty-sixth embodiment.

It is understood that the invention is not limited to the particular construction and arrangement herein illustrated and described but embraces such modified forms thereof as come within the scope of the following claims.

What is claimed is:

1. A power plant comprising:
   a compressor for compressing a mixture gas of steam and carbon dioxide so as to produce a working fluid;
   a combustor disposed downstream of said compressor and adapted to receive and burn oxygen, a reformed fuel mixture of hydrogen and carbon dioxide, and the working fluid produced by said compressor so as to produce a combustion gas;
   a gas turbine disposed downstream of said combustor and adapted to receive and expand the combustion gas produced by said combustor so as to produce an exhaust gas;
   a bottoming system disposed downstream of said gas turbine and including a condenser for receiving and condensing the exhaust gas from said gas turbine so as to produce water;
   a heat exchanger having an exhaust gas side disposed downstream of said gas turbine for receiving and cooling the exhaust gas produced by said gas turbine so as to produce the mixture gas to be compressed by said compressor, and having a water side disposed downstream of said bottoming system for heating the water condensed by said bottoming system by using the exhaust gas in said exhaust gas side so as to produce steam;
   a steam turbine disposed downstream of said water side of said heat exchanger for receiving and expanding the steam produced by said water side of said heat exchanger so as to produce exhaust steam, said steam turbine being disposed upstream of said combustor such that said combustor receives the exhaust steam produced by said steam turbine;
   a reformer having an exhaust gas side for receiving the exhaust gas produced by said gas turbine and a fuel side for receiving a fuel mixture of methanol and water, said reformer being adapted so that the fuel mixture of methanol and water in said fuel side is heated by using the exhaust gas in said exhaust gas side so as to produce the reformed fuel mixture of hydrogen and carbon dioxide, said fuel side of said reformer being disposed upstream of said combustor such that said combustor receives the reformed fuel mixture of hydrogen and carbon dioxide produced by said reformer;
   a gas turbine cooling system for extracting a portion of the working fluid produced by said compressor and a portion of the exhaust steam produced by said steam turbine so as to produce a cooling medium, and for channeling the cooling medium into said gas turbine so as to cool said gas turbine; and
   a regenerative heat exchanger having a working fluid side between said compressor and said combustor for receiving the working fluid from said compressor, and having an exhaust gas side between said gas turbine and said heat exchanger for receiving the exhaust gas from said gas turbine, said regenerative heat exchanger being adapted to heat the working fluid by using the exhaust gas in the exhaust gas side;
   wherein said bottoming system and said compressor are arranged such that a portion of the water produced by said bottoming system is supplied to said compressor, said heat exchanger and said bottoming system being arranged such that the exhaust gas cooled by said heat exchanger is received by said bottoming system.

2. The power plant of claim 1, wherein said compressor comprises a low pressure compressor, a high pressure compressor, and a passage connecting said low pressure compressor and said high pressure compressor, said compressor further comprising an intercooler in said passage, said bottoming system and said intercooler being arranged such that a portion of the water produced by said bottoming system is supplied to said intercooler.

3. A power plant comprising:
   a compressor for compressing a mixture gas of steam and carbon dioxide so as to produce a working fluid;
   a combustor disposed downstream of said compressor and adapted to receive and burn oxygen, a reformed fuel mixture of hydrogen and carbon dioxide, and the working fluid produced by said compressor so as to produce a combustion gas;

a gas turbine disposed downstream of said combustor and adapted to receive and expand the combustion gas produced by said combustor so as to produce an exhaust gas;

a bottoming system disposed downstream of said gas turbine and including a condenser for receiving and condensing the exhaust gas from said gas turbine so as to produce water;

a heat exchanger having an exhaust gas side disposed downstream of said gas turbine for receiving and cooling the exhaust gas produced by said gas turbine so as to produce the mixture gas to be compressed by said compressor, and having a water side disposed downstream of said bottoming system for heating the water condensed by said bottoming system by using the exhaust gas in said exhaust gas side so as to produce steam;

a steam turbine disposed downstream of said water side of said heat exchanger for receiving and expanding the steam produced by said water side of said heat exchanger so as to produce exhaust steam, said steam turbine being disposed upstream of said combustor such that said combustor receives the exhaust steam produced by said steam turbine;

a reformer having an exhaust gas side for receiving the exhaust gas produced by said gas turbine and a fuel side for receiving a fuel mixture of methanol and water, said reformer being adapted so that the fuel mixture of methanol and water in said fuel side is heated by using the exhaust gas in said exhaust gas side so as to produce the reformed fuel mixture of hydrogen and carbon dioxide, said fuel side of said reformer being disposed upstream of said combustor such that said combustor receives the reformed fuel mixture of hydrogen and carbon dioxide produced by said reformer;

a gas turbine cooling system for extracting a portion of the working fluid produced by said compressor and a portion of the exhaust steam produced by said steam turbine so as to produce a cooling medium, and for channeling the cooling medium into said gas turbine so as to cool said gas turbine; and a regenerative heat exchanger having a working fluid side between said compressor and said combustor for receiving the working fluid from said compressor, and having an exhaust gas side between said gas turbine and said heat exchanger for receiving the exhaust gas from said gas turbine, said regenerative heat exchanger being adapted to heat the working fluid by using the exhaust gas in the exhaust gas side;

wherein said bottoming system includes a $CO_2$ compressor, said bottoming system and said compressor being arranged such that a portion of the water produced by said bottoming system is supplied to said compressor, said heat exchanger and said bottoming system being arranged such that the exhaust gas cooled by said heat exchanger is received by said bottoming system.

4. The power plant of claim 3, wherein said compressor comprises a low pressure compressor, a high pressure compressor, and a passage connecting said low pressure compressor and said high pressure compressor, said compressor further comprising an intercooler in said passage, said bottoming system and said intercooler being arranged such that a portion of the water produced by said bottoming system is supplied to said intercooler.

5. A power plant comprising:

a compressor for compressing a mixture gas of steam and carbon dioxide so as to produce a working fluid;

a combustor disposed downstream of said compressor and adapted to receive and burn oxygen, a reformed fuel mixture of hydrogen and carbon dioxide, and the working fluid produced by said compressor so as to produce a combustion gas;

a gas turbine disposed downstream of said combustor and adapted to receive and expand the combustion gas produced by said combustor so as to produce an exhaust gas;

a bottoming system disposed downstream of said gas turbine and including a condenser for receiving and condensing the exhaust gas from said gas turbine so as to produce water;

a heat exchanger having an exhaust gas side disposed downstream of said gas turbine for receiving and cooling the exhaust gas produced by said gas turbine so as to produce the mixture gas to be compressed by said compressor, and having a water side disposed downstream of said bottoming system for heating the water condensed by said bottoming system by using the exhaust gas in said exhaust gas side so as to produce steam, said heat exchanger being disposed directly upstream of said combustor such that said combustor receives the steam produced by said heat exchanger;

a reformer having an exhaust gas side for receiving the exhaust gas from said gas turbine and a fuel side for receiving a fuel mixture of methanol and water, said reformer being adapted so that the fuel mixture of methanol and water in said fuel side is heated by using the exhaust gas in said exhaust gas side so as to produce the reformed fuel mixture of hydrogen and carbon dioxide, said fuel side of said reformer being disposed upstream of said combustor such that said combustor receives the reformed fuel mixture of hydrogen and carbon dioxide produced by said reformer; and a gas turbine cooling system for extracting a portion of the working fluid produced by said compressor so as to produce a cooling medium, and for channeling the cooling medium into said gas turbine so as to cool said gas turbine.

6. The power plant of claim 5, wherein said gas turbine cooling system is adapted to further extract a portion of the water being heated in said water side of said heat exchanger so as to produce the cooling medium.

7. The power plant of claim 6, wherein said compressor comprises a low pressure compressor, a high pressure compressor, and a passage connecting said low pressure compressor and said high pressure compressor, said compressor further comprising an intercooler in said passage, said bottoming system and said intercooler being arranged such that a portion of the water produced by said bottoming system is supplied to said intercooler.

8. The power plant of claim 6, wherein said bottoming system and said compressor are arranged such that a portion of the water produced by said bottoming system is supplied to said compressor, said heat exchange and said bottom system being arranged such that the exhaust gas cooled by said heat exchanger is received by said bottoming system.

9. The power plant of claim 8, wherein said compressor comprises a low pressure compressor, a high pressure compressor, and a passage connecting said low pressure compressor and said high pressure compressor, said compressor further comprising an intercooler in said passage, said bottoming system and said intercooler being arranged such that a portion of the water produced by said bottoming system is supplied to said intercooler.

10. The power plant of claim 6, wherein said bottoming system includes a $CO_2$ compressor, and said bottoming system and said compressor being arranged such that a portion of the water produced by said bottoming system is supplied to said compressor, said heat exchanger and said bottoming system being arranged such that the exhaust gas cooled by said heat exchanger is received by said bottoming system.

11. The power plant of claim 10, wherein said compressor comprises a low pressure compressor, a high pressure compressor, and a passage connecting said low pressure compressor and said high pressure compressor, said compressor further comprising an intercooler in said passage, said bottoming system and said intercooler being arranged such that a portion of the water produced by said bottoming system is supplied to said intercooler.

12. The power plant of claim 5, wherein said bottoming system includes a low pressure steam turbine upstream of said condenser such that said condenser receives and condenses steam from said low pressure steam turbine so as to produce water, an inlet of said low pressure turbine being disposed downstream of said gas turbine so as to receive the exhaust gas produced by said gas turbine.

* * * * *